(12) United States Patent
Will et al.

(10) Patent No.: US 11,631,546 B2
(45) Date of Patent: Apr. 18, 2023

(54) CAPACITOR AND METHOD FOR PRODUCING A CAPACITOR

(71) Applicant: TDK Electronics AG, Munich (DE)

(72) Inventors: Norbert Will, Heidenheim (DE); Fabio Augusto Bueno De Camargo Mello, Munich (DE)

(73) Assignee: TDK ELECTRONICS AG, Munich (DE)

( * ) Notice: Subject to any disclaimer, the term of this patent is extended or adjusted under 35 U.S.C. 154(b) by 82 days.

(21) Appl. No.: 16/982,686

(22) PCT Filed: Mar. 26, 2019

(86) PCT No.: PCT/EP2019/057625
§ 371 (c)(1),
(2) Date: Sep. 21, 2020

(87) PCT Pub. No.: WO2019/185652
PCT Pub. Date: Oct. 3, 2019

(65) Prior Publication Data
US 2021/0005394 A1 Jan. 7, 2021

(30) Foreign Application Priority Data
Mar. 27, 2018 (DE) .......................... 102018107292.9

(51) Int. Cl.
*H01G 9/008* (2006.01)
*H01G 9/00* (2006.01)
*H01G 9/15* (2006.01)

(52) U.S. Cl.
CPC .......... *H01G 9/008* (2013.01); *H01G 9/0029* (2013.01); *H01G 9/151* (2013.01)

(58) Field of Classification Search
CPC ...................................................... H01G 9/005
See application file for complete search history.

(56) References Cited

U.S. PATENT DOCUMENTS

| 2,016,302 A | 10/1935 | Sprague | |
| 2,569,925 A * | 10/1951 | McKnight | H01L 23/48 174/50.56 |
| 2,604,517 A * | 7/1952 | Brennan | H01G 9/04 29/25.03 |
| 2,932,153 A * | 4/1960 | Bernard | H01G 9/022 205/326 |
| 3,010,056 A | 11/1961 | Kurland et al. | |
| 3,569,794 A | 3/1971 | Carino | |

(Continued)

FOREIGN PATENT DOCUMENTS

CN 2512094 Y 9/2002
CN 101317242 A 12/2008
(Continued)

*Primary Examiner* — Eric W Thomas
(74) *Attorney, Agent, or Firm* — Slater Matsil, LLP

(57) ABSTRACT

A capacitor and a method for producing a capacitor are disclosed. In an embodiment, a capacitor includes a winding having a cathode foil, an anode foil, separators arranged therebetween and a projection region in which the cathode foil projects beyond the anode foil, wherein, in the projection region, a plurality of layers of the cathode foil are arranged to form a bundle and are directly electrically connected to one another.

20 Claims, 15 Drawing Sheets

(56) References Cited

U.S. PATENT DOCUMENTS

| | | | |
|---|---|---|---|
| 3,842,325 A * | 10/1974 | Callins | H01G 9/008 29/25.03 |
| 4,509,094 A | 4/1985 | Finkelstein et al. | |
| 4,545,108 A * | 10/1985 | Adams | H01G 9/0029 228/115 |
| 4,987,519 A | 1/1991 | Hutchins et al. | |
| 5,245,513 A * | 9/1993 | Maijers | H01G 9/10 361/520 |
| 6,054,233 A | 4/2000 | Vourlis | |
| 6,525,924 B2 | 2/2003 | Gallay et al. | |
| 8,837,115 B2 | 9/2014 | Ishida | |
| 10,096,430 B2 | 10/2018 | Ashino et al. | |
| 10,381,688 B2 | 8/2019 | Baston et al. | |
| 2007/0115611 A1 | 5/2007 | Fujimoto et al. | |
| 2009/0122467 A1 | 5/2009 | Hirose et al. | |
| 2009/0147444 A1 | 6/2009 | Takaoka | |
| 2009/0246612 A1 | 10/2009 | Naoi et al. | |
| 2009/0279231 A1 | 11/2009 | Hibi et al. | |
| 2009/0310284 A1 | 12/2009 | Kee | |
| 2012/0162859 A1 | 6/2012 | Yokoo | |
| 2012/0243146 A1 | 9/2012 | Ishida | |
| 2014/0036414 A1 | 2/2014 | Xu et al. | |
| 2015/0243453 A1 * | 8/2015 | Taguchi | H01M 50/528 29/25.03 |
| 2016/0099114 A1 | 4/2016 | Komatsu et al. | |
| 2016/0351966 A1 * | 12/2016 | Batson | H01M 10/052 |
| 2017/0194106 A1 | 7/2017 | Majima et al. | |

FOREIGN PATENT DOCUMENTS

| | | | |
|---|---|---|---|
| CN | 101604579 A | 12/2009 | |
| CN | 102222568 A | 10/2011 | |
| CN | 102576612 A | 7/2012 | |
| CN | 103268822 A | 8/2013 | |
| CN | 204424092 U | 6/2015 | |
| CN | 205050703 U | 2/2016 | |
| CN | 105940474 A | 9/2016 | |
| CN | 106663538 A | 5/2017 | |
| DE | 1069783 B | 3/1953 | |
| DE | 1925509 A1 | 11/1969 | |
| DE | 2200582 A | 11/1972 | |
| DE | 3843653 A * | 6/1990 | H01G 9/00 |
| DE | 4213651 A1 | 10/1993 | |
| DE | 69007279 T2 | 9/1994 | |
| DE | 60030131 T2 | 3/2007 | |
| EP | 111401 A2 | 6/1984 | |
| EP | 1962306 A1 | 8/2008 | |
| EP | 2169695 A1 | 3/2010 | |
| EP | 3109876 A1 | 12/2016 | |
| EP | 3279910 A1 | 2/2018 | |
| JP | S48034035 U | 11/1975 | |
| JP | S50137540 U | 11/1975 | |
| JP | S51009897 B | 3/1976 | |
| JP | S56036139 U | 4/1981 | |
| JP | S58012933 U | 1/1983 | |
| JP | S59132117 A | 7/1984 | |
| JP | S60189920 A | 9/1985 | |
| JP | H05251283 A | 9/1993 | |
| JP | H1055936 A | 2/1998 | |
| JP | H10229032 A | 8/1998 | |
| JP | 2007335156 A | 12/2007 | |
| JP | 2009021629 A | 1/2009 | |
| JP | 2009026853 A | 2/2009 | |
| JP | 2009231551 A | 10/2009 | |
| JP | 2011159518 A | 8/2011 | |
| JP | 2011233662 A | 11/2011 | |
| JP | 2013149388 A | 8/2013 | |
| JP | 2017504165 A | 2/2017 | |
| WO | 2014083765 A1 | 6/2014 | |

* cited by examiner

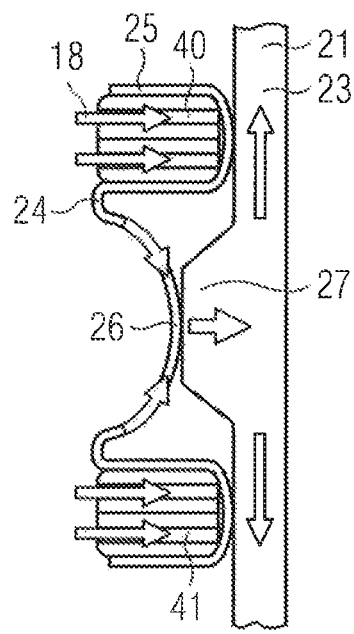
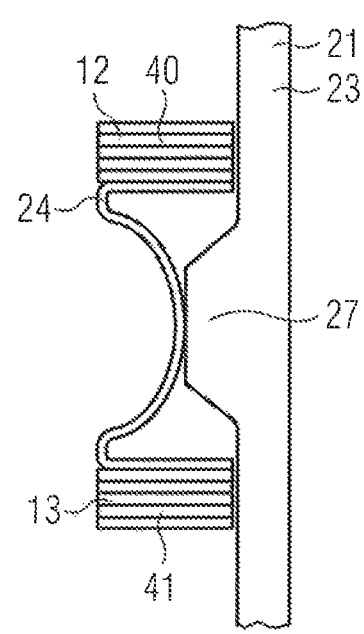
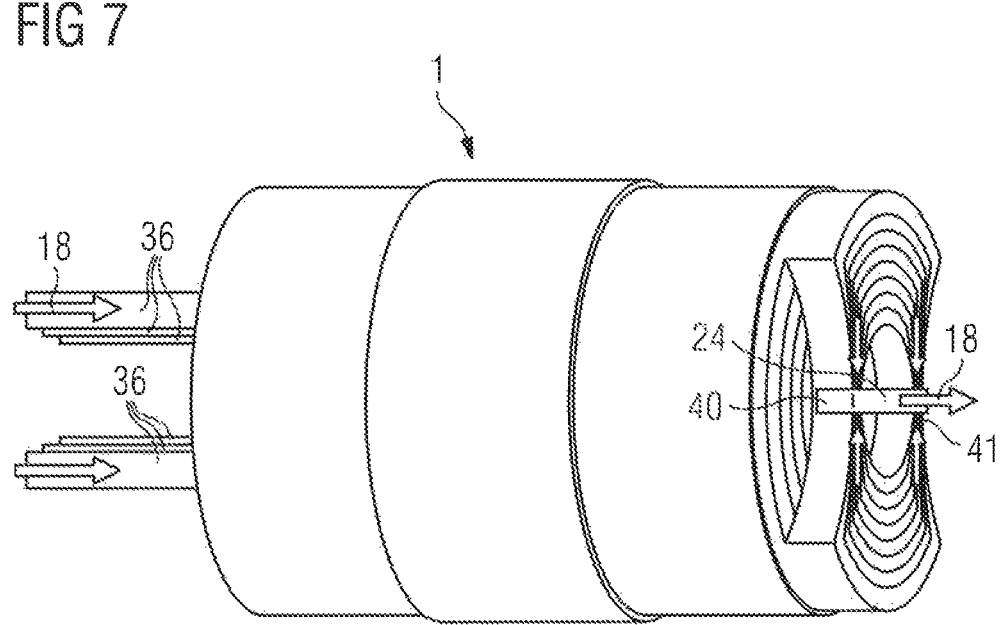

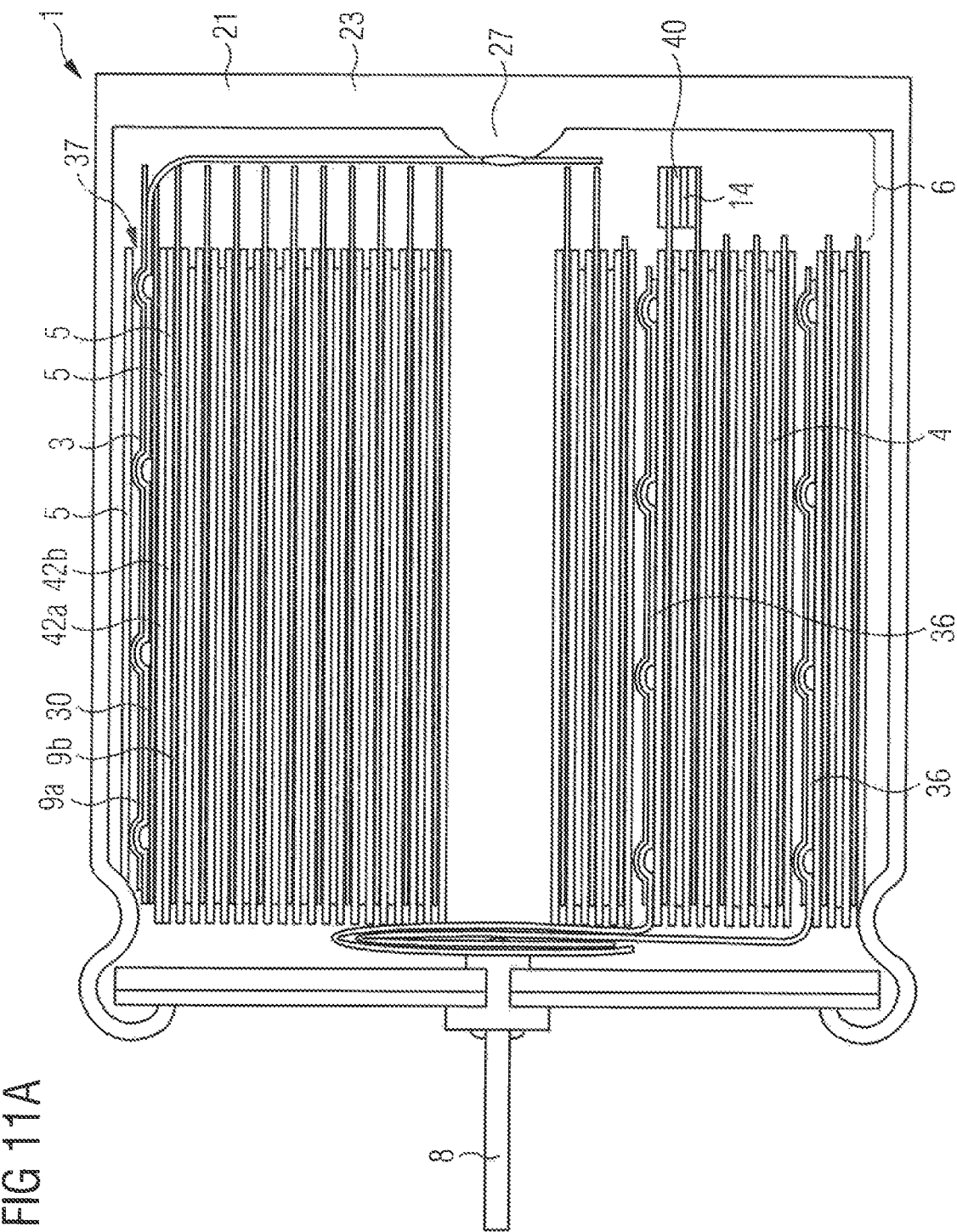

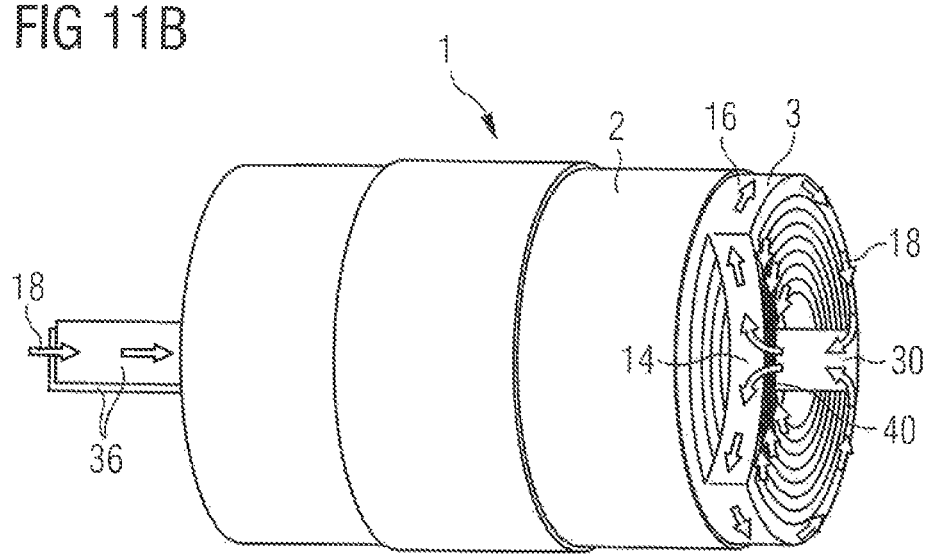

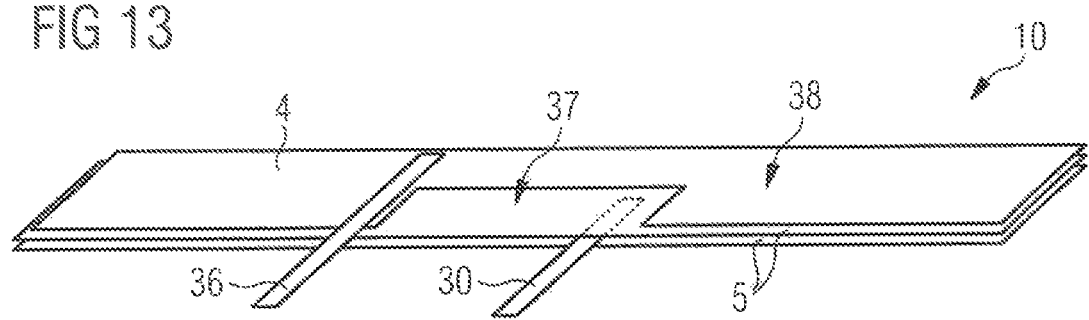

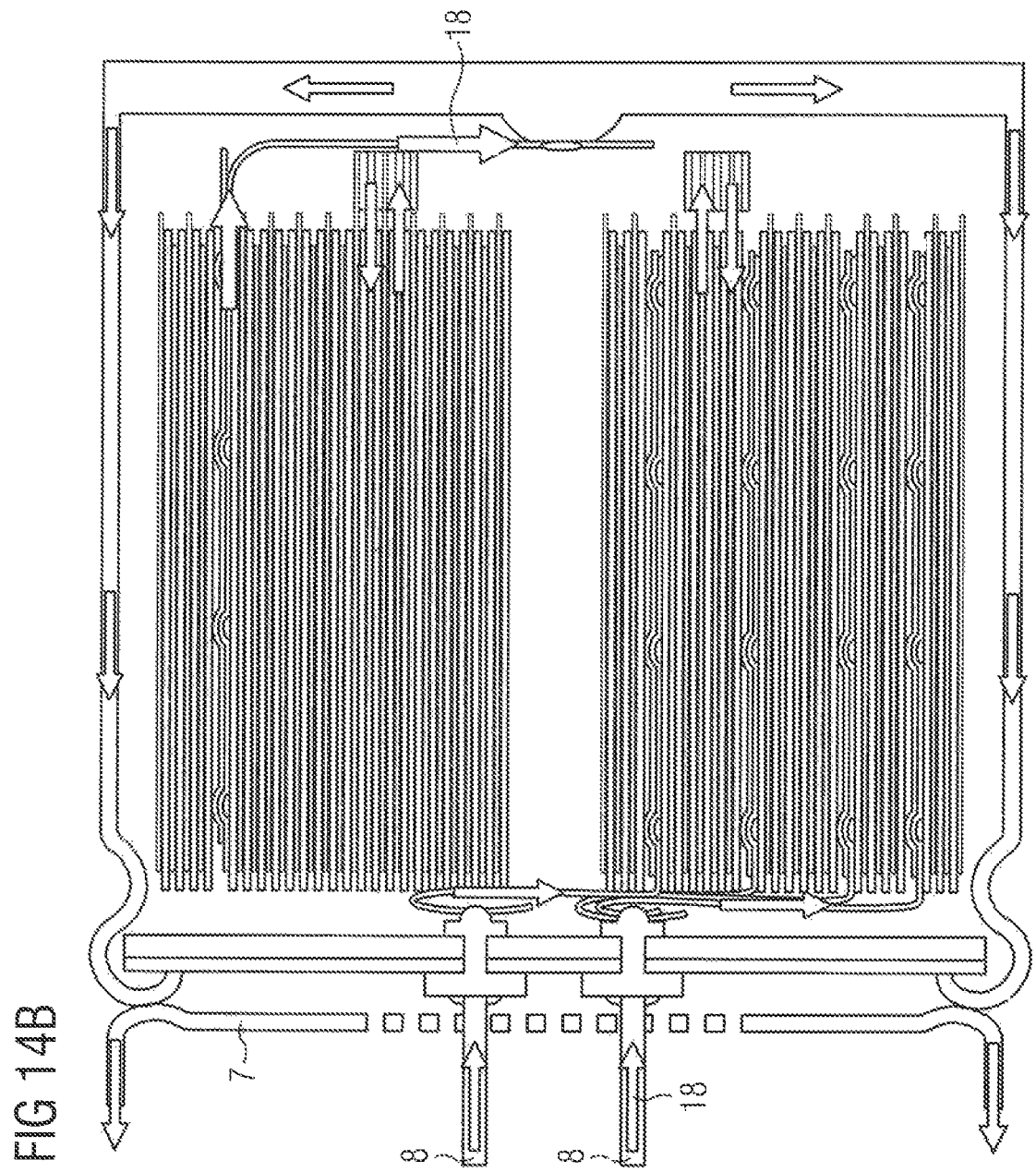

CAPACITOR AND METHOD FOR PRODUCING A CAPACITOR

This patent application is a national phase filing under section 371 of PCT/EP2019/057625, filed Mar. 26, 2019, which claims the priority of German patent application 102018107292.9, filed Mar. 27, 2018, each of which is incorporated herein by reference in its entirety.

TECHNICAL FIELD

The present invention relates to a capacitor, in particular to an electrolytic capacitor.

BACKGROUND

A capacitor has a winding comprising an anode foil, a cathode foil and separators. A capacitor of this kind is described, for example, in European Patent No. EP 2169695 B. The capacitor can be designed, for example, as an electrolytic capacitor only with a liquid electrolyte, as a polymer electrolytic capacitor with a solid polymer electrolyte or else as a hybrid polymer electrolytic capacitor with a solid polymer electrolyte and a liquid electrolyte.

In the case of capacitors with large diameters and therefore long electrode paths, significant electrical losses in the electrode paths can occur given alternating currents. In particular, a thin cathode foil exhibits a large proportion of these losses. In this case, the ESR ("equivalent series resistance") of the cathode foil can dominate the entire ESR of the capacitor and limit the alternating current-carrying capacity. For example, this can be a limiting factor in the case of hybrid polymer capacitors given diameters starting from 12 mm and in the case of low-voltage electrolytic capacitors of radial design starting from 18 mm.

SUMMARY

Embodiments provide an improved capacitor and a method for producing a capacitor. In particular, specific embodiments can have a reduced ESR and/or ESL ("equivalent series inductance").

According to a first embodiment, a capacitor has a winding of a cathode foil, an anode foil and separators which are arranged therebetween. The winding has, at an end side face, a projection region in which the cathode foil projects beyond the anode foil. In the projection region, a plurality of layers of the cathode foil are arranged to form a bundle and are directly electrically connected to one another there. In this case, regions of the respective foil which are arranged one above the other in the radial direction are called layers. In the projection region, the cathode foil in particular also projects beyond the separators, and therefore there is no further foil arranged between adjacent layers of the cathode foil here.

The cathode foil has, for example, an aluminum foil which is provided with a coating. The coating is, in particular, a dielectric. The coating is, for example, an aluminum oxide, titanium oxide layer or carbon layer. The cathode foil can have the coating over its entire surface area. The coating is in particular formed homogenously over the entire surface area. In particular, the cathode foil does not have any regions which are not provided with the coating. In this case, only cut edges, which are produced when the foil is cut to length, can be free of the coating. The anode foil can likewise comprise an aluminum foil. The anode foil can also have a coating.

A shortened path for the current is created owing to the direct connection of layers of the cathode foil. In particular, the current can flow radially in the bundle, and therefore the current does not have to take the long helical path along the wound foil. Therefore, the effective path resistance of the cathode foil can be reduced, this leading to a considerable reduction in losses particularly for capacitors with a large diameter. Therefore, the ESR can be reduced and the alternating current-carrying capacity can be increased.

The bundled layers of the cathode foil are, in particular, welded to one another, for example by laser welding or electric spot welding. As an alternative, the electrical connection can also be made by mechanical processing, for example pinching the layers.

The electrical connection of the layers is present, for example, at a contact point in the bundle. This contact point is, in particular, a local region in which current flow can take place between a large numbers of layers in the radial direction. In particular, the current path from one layer which is far away from a cathode connection along the wound cathode foil can therefore be considerably shortened. In this case, current flow can take place in the radial direction across a plurality of layers to a layer in the bundle that has the shortest path to the cathode connection. Depending on the manner of contact-connection of the cathode foil, a shortened current path can be provided for an outer layer in the winding for example.

In order to make it easier to form the bundle of the layers of the cathode foil, it is advantageous to increase the mechanical flexibility of the layers of the cathode foil in the projection region. Therefore, damage to the rest of the winding by mechanical deformation can be prevented during bundling. In one embodiment, the winding has an incision in the cathode foil in the projection region. In this case, the incision runs through a plurality of radially adjacent layers of the cathode foil. In particular, the incision extends through all of the layers which are part of the bundle. The incision runs, for example, perpendicularly to the winding axis.

Owing to the incision, the mechanical flexibility of the regions to be bundled is increased, and therefore deformation of these regions does not lead to deformation of the active region of the winding. Therefore, those regions of the cathode foil which are located in the bundle are partially mechanically decoupled from the rest of the cathode foil. For example, on account of the incision, there are flexible strips in the cathode foil, which flexible strips are separated from the rest of the cathode foil in the winding direction but are connected to the rest of the cathode foil at their lateral ends.

In one embodiment, each layer of the cathode foil, that is to say from the outermost layer to the innermost layer at the winding center, is arranged in the bundle and said layers are directly electrically connected to one another. However, it may also be sufficient to arrange only a portion of the layers to form the bundle and to directly electrically connect said layers to one another. For example, only the outer layers are present in the bundle.

In one embodiment, the projection region has a plurality of bundles of this kind. For example, in a plan view of the winding axis, one bundle is arranged on one side with respect to the winding center and a further bundle is arranged on the opposite side with respect to the winding center. There can also be a plurality of bundles on a common side with respect to the winding center. This can be advantageous for capacitors with a large diameter. In addition, redundancy can be created in the connection and the reliability can be increased owing to the formation of a plurality of bundles.

The capacitor with bundled cathode layers is advantageous for a large number of designs. The capacitor has, in particular, a housing which can be designed in the form of a can. In this case, the housing has a housing base, a housing wall and a housing opening. The housing opening is closed, for example, by a cover.

In one embodiment, a cathode connection for making contact with the cathode foil and an anode connection for making contact with the anode foil are passed through the cover. This design is also referred to as a radial design.

In a further embodiment, the cathode foil is connected to the cathode connection via the housing. The cathode connection can be designed as a wire which is arranged perpendicularly and centrally in the can base. This design is also referred to as an axial design. An additional or alternative cathode connection includes, for example, a so-called solder star or insert star which is connected to the housing on the side of the housing opening.

The connections can be designed, for example, in the form of so-called "paddle tabs" in which the connection passes from the outside, through the cover, directly into the winding and makes contact with the corresponding foil.

The connections can be connected to separate contacts, for example, in the interior of the housing, too. The contacts are designed, for example, in a strip-like manner and pass into the winding for making contact with the corresponding foil. The contacts can have a bent shape between the winding and the connection to the connection. Here, said connection can be, in particular, a solderable clamping connection (snap-in) or "solder claw capacitor" or a screw terminal. A plurality of contacts of this kind can also be connected to one connection here, this also being referred to as a "multi-tab" contact connection.

In one embodiment, the bundle of the cathode foil is electrically connected to the housing. In particular, the connection can be made via a connecting piece which is directly electrically connected to the bundle and is electrically connected to the housing, in particular to the housing base. For example, the electrical connection can be established by welding.

In one embodiment, there is no cathode contact for making contact with the cathode foil arranged in the winding. The intended meaning here is, in particular, a cathode contact which is welded to the cathode foil within the winding. For example, the electrical contact-connection is made only via the bundle of the cathode foils. This can contribute to a further increase in the switching strength.

In one embodiment, the capacitor has a plurality of anode connections which protrude out of the cover of the housing. For example, the anode connections are designed as so-called pins. In particular, a connection, which is usually present, for making contact with the cathode foil can be repurposed as a further anode connection. Said connections are, for example, connections in the form of paddle tabs.

In this case, the cathode connection can be made, for example, via the housing. Owing to the use of a plurality of anode connections, the path resistance (ESR) of the anode foil can be considerably reduced. Furthermore, the magnetic field density and therefore also the inductance (ESL) can be reduced owing to the splitting of the current. This renders possible, in particular, expedient use of capacitors with a relatively large diameter, too.

In one embodiment, a cathode contact is not positioned laterally centrally on the cathode foil in a plan view of an unrolled cathode foil. The cathode contact is usually positioned centrally in order to keep the path resistance low. The degree of freedom in respect of positioning the cathode contact within the winding is increased owing to the bundling of the cathode foils in the projection region. Therefore, it is possible, for example, to arrange the cathode contact in the vicinity of a side edge of the cathode foil, and therefore it is arranged far on the outside or far on the inside in the winding. In this case, it is not necessary to position further cathode contacts in a central region of the winding in order to reduce the path resistance.

For example, the cathode contact is positioned in such a way that it is at least twice as far away from one lateral edge as from the other lateral edge of the unrolled cathode foil. In particular, there is then also no further cathode contact which is situated closer to the other radial edge. Therefore, all of the cathode contacts are, for example, at least twice as far away from one lateral edge as from the other lateral edge of the cathode foil.

In one embodiment, a plurality of cathode connections protrude out of a cover of the housing. In this case, the cathode connections are connected, for example, to cathode contacts which are connected to the cathode foil within the winding. In particular, the cathode contact can also be arranged radially far on the outside in the winding since there is a reduction in the path resistance owing to the bundling of the cathode foil. Therefore, it is possible overall to form more than two connections which protrude out of the cover of the housing. This renders possible splitting of the currents and a reduction in the inductance.

According to a further embodiment, a capacitor a winding comprising a cathode foil, an anode foil and separators which are arranged therebetween on. The winding has an overlap-free region in which the cathode foil does not overlap with the anode foil. In other words, in a plan view of the unrolled foils, the cathode foil is not covered by the anode foil and does not cover the anode foil in the overlap-free region. The overlap-free region adjoins an overlapping region, in which the cathode foil overlaps with the anode foil, in the lateral direction. In this case, the lateral direction is a direction perpendicular to the winding axis along an unrolled foil.

The capacitor according to the further embodiment can have all of the functional and structural properties of the above-described capacitor with bundling of the cathode foil in the projection region. However, it is also conceivable to design the capacitor according to the further embodiment without bundling of the cathode foil in the projection region.

The capacitor has a cathode contact for making contact with the cathode foil, which cathode contact is arranged in the overlap-free region. In particular, the cathode contact is arranged on the cathode foil only in the overlap-free region. In this way, the formation of potential differences and resulting equalization currents can be prevented or reduced. Potential differences of this kind are often produced due to gaps which can form, inter alia, below the cathode contact. If a region of the separator is situated below the cathode contact and the anode foil adjoins the separator, this can lead to the local electrolyte potential of the separator being dominated by the anode foil and this resulting in undesired potential differences in the event of changes in voltage.

In one embodiment, the overlap-free region is arranged on a lateral edge of the cathode foil. Said lateral edge may be the edge which is adjacent to the winding center in the winding, or is arranged on the side face of the winding. Forming the overlap-free region on a lateral edge of the cathode foil requires only a small amount of additional expenditure. There can also be overlap-free regions on both lateral edges and contact elements arranged thereon.

An embodiment of this kind is particularly advantageous when bundling the cathode foils in the projection region since, owing to the bundling, the path resistance can be kept low when arranging the cathode contact on the lateral edge.

In one embodiment, the overlap-free region is arranged between two overlapping regions in the lateral direction. Therefore, in a plan view of the cathode foil, there is at least one overlapping region on either side of the overlap-free region. The overlap-free region can be, in particular, a laterally central region of the cathode foil. Therefore, the cathode contact is also arranged centrally and the path resistance is not increased.

The anode foil can be broken down into two separate sub-regions between which the overlap-free region is situated. Since the sub-regions are separated from one another, it is necessary to make electrical contact with the two sub-regions separately, for example by an anode contact in each case.

The anode foil can also have only one recess which does not constitute separation of the anode foil. In particular, the recess does not extend from an end-side face to the opposite end-side face of the winding. In this case, a single anode contact for making contact with the anode foil is sufficient. A plurality of anode contacts can also be provided for the purpose of reducing the path resistance.

A further embodiment specifies a method for producing a capacitor. Said capacitor may be, in particular, the above-described capacitor.

The method specifies a winding having an anode foil a cathode foil and separators which are arranged therebetween. The winding has a projection region in which the cathode foil projects beyond the anode foil. Said projection region is, in particular, an end-side region of the winding.

An incision is made in the cathode foil in the projection region in the winding. The incision is made, for example, using a blade or a similar cutting tool. In particular, the incision can run perpendicularly to the winding axis. In this case, the incision can run through a plurality of layers of the cathode foil. A plurality of layers of the cathode foil is then brought together in the region between the incision and the end side of the winding. In particular, a bundle is formed. For example, a set of tongs or another clamping tool is used for this purpose. On account of the incision, the mechanical flexibility of the layers of the cathode foil is increased in this region, and therefore deformation can take place without the risk of damage to the functional region of the winding.

Electrical contact is established between the layers which are brought together. This is done, for example, by a welding process or a mechanical process. In particular, a direct electrical connection is established at a contact point in this case, and therefore current flow can take place between the layers in the radial direction for example.

Further embodiments of the method are disclosed in connection with the above-described capacitor. In particular, all of the properties of the above-described capacitor are disclosed as properties of the method embodiment. Furthermore, the capacitor can be produced by the above-described method and have all of the structural and functional properties which have been described in connection with the method.

The description of the subjects specified here is not limited to the individual specific embodiments. Rather, the features of the individual embodiments can be combined with one another—insofar as this is technically expedient.

BRIEF DESCRIPTION OF THE DRAWINGS

The subjects described here will be explained in more detail below with reference to schematic exemplary embodiments.

In the drawings:

FIGS. 5A, 5B and 5C show a further embodiment of a capacitor in longitudinal section, with a schematically illustrated current flow and in a detail in longitudinal section;

FIG. 6 shows a detail of a further embodiment of a capacitor in longitudinal section;

FIG. 7 shows a further embodiment of a capacitor and a side view with a schematically illustrated current flow;

FIGS. 11A and 11B show a further embodiment of a capacitor in longitudinal section and with a schematically illustrated current flow;

FIG. 13 shows unrolled foils of a further embodiment of a capacitor in a perspective view;

FIGS. 14A and 14B show a further embodiment of a capacitor in longitudinal section and with a schematically illustrated current flow.

DETAILED DESCRIPTION OF ILLUSTRATIVE EMBODIMENTS

In the following figures, parts of the various embodiments that correspond in terms of function or structure are preferably denoted by the same reference signs.

Figure 1:
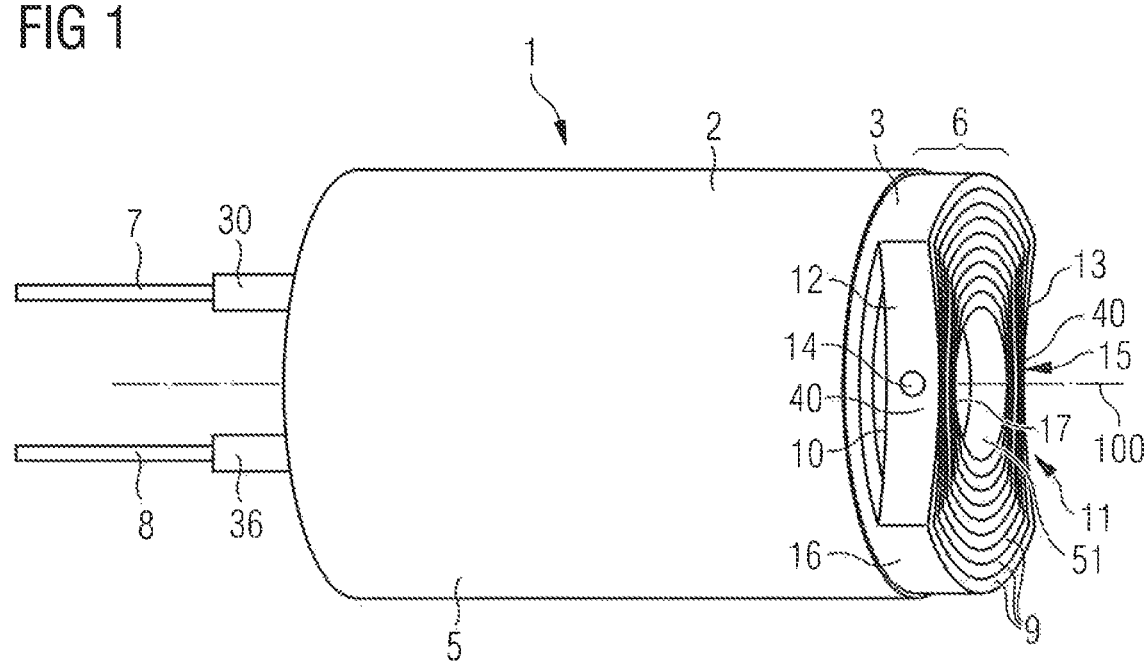
FIG. 1 shows one embodiment of a capacitor in a perspective side view.
Figure 5A:
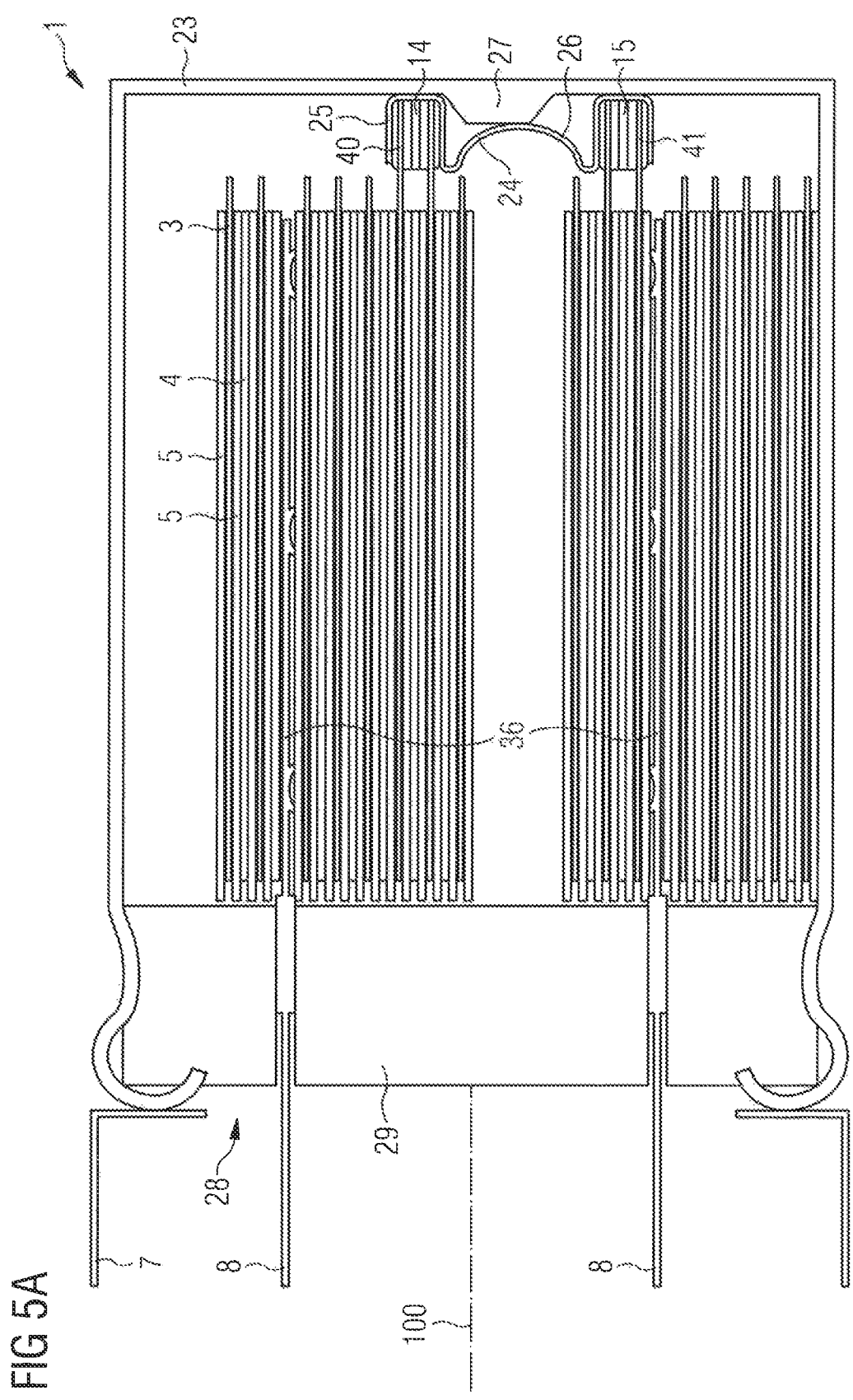

FIG. 1 shows an embodiment of a capacitor 1 having a winding 2 comprising cathode foils 3, anode foils 4 and separators 5 which are arranged therebetween (see FIG. 5A).

The capacitor 1 may be, for example, an electrolytic capacitor, for example an aluminum electrolytic capacitor. In this case, the separators 5 are impregnated with an electrolyte. Said electrolytic capacitor may also be, for example, a polymer electrolytic capacitor or a hybrid polymer electrolytic capacitor.

The cathode foils 3, anode foils 4 and separators 5 are arranged in such a way that there is a separator 5 as a spacer between the cathode foil 3 and the anode foil 4 on either side. A winding hole 51, around which the foils 3, 4, 5 are wound, is located in the center of the winding 2.

The winding 2 has a projection region 6 in which the cathode foil 3 projects beyond the anode foil 4 and the separators 5. Therefore, only the cathode foil 3 is located in the projection region 6. The projection region 6 is located at an end-side face of the winding 1.

A connection 7 for electrical connection of the cathode foil 3 and a further connection 8 for electrical connection of the anode foil are provided at the opposite end. In the present case, said connections are so-called "paddle tabs" in which the external connections 7, 8 pass into the winding 2 and there are electrically connected to the cathode foil 3 and anode foil 4 as cathode contacts 30 and anode contacts 36. Here, the connections 7, 8 are arranged on the same end side of the capacitor 1.

There is at least one incision 10 in the cathode foil 3 in the projection region 6. Incisions 10, 11 can also be made in different positions, for example an incision 11 on an opposite side of the winding 2, as shown here. The incisions 10, 11 each run through one or more adjacent layers 9 of the cathode foil 3.

The layers 3 are not completely severed from the rest of the cathode foil 3 since the incision 10 does not run all the way around the winding 2. For example, the incision 10, 11 extends in an angular range relative to the winding axis 14 of between 60° and 140°, in particular through 100°. For example, the incision is situated approximately 1 mm away from the end-side winding face. The incision can be made by a blade or another cutting tool.

Owing to the incision 10, 11, the severed sub-regions of the layers 9 are mechanically flexible. In particular, flexible strips 12, 13 are produced in the individual layers 9. As a result, it is possible to bring together the layers 9 without further mechanical damage to the functioning region of the winding 2 to form bundles 40, 41 in such a way that said layers bear against one another at contact points 14 and 15.

The strips 12, 13 are also directly electrically connected to one another at the respective contact point 14, 15. Therefore, the contact point 14, 15 forms a "bypass", and therefore current flow does not take place from a radially outer layer 16 via the turns of the winding 2 in the turn direction, but rather current flow can take place directly to the cathode contact 30 in the radial direction. Therefore, the contact points 14, 15 each constitute a central contact-connection of a plurality of layers 9 and are also referred to as central contact points in the text which follows. One contact point 14 for each layer 9 may be sufficient here. Two contact points lead to increased reliability.

In this way, the path resistance of the cathode foil 3 and therefore the ESR are greatly reduced. Therefore, it is possible to use capacitors with relatively large diameters, for example with diameters which are 50% larger than is usual for the respective design, in an expedient manner.

The greatest effect is already achieved with a single incision 10 for each turn of the cathode foil 3. One or more further incisions 11 lead to an increase in the reliability of the contact. More than two incisions 10, 11 may also be expedient here.

In the present case, the incision 10, 11 does not pass through all of the layers 9 of the cathode foil 3, but rather extends from the outermost layer 16 through further layers 9, but not as far as to the innermost layer 17. In this case, the innermost layer 17 is the layer which is situated closest to the winding axis 100. The contact points 12, 13 connect only the layers 9 which are provided with the incisions 10, 11.

The electrical connection at the contact points 14, 15 can be, for example, a welded connection. Technologies used here include, in particular, laser welding and electric spot welding. Since the welded connection is made in the projection region 6 which is thermally well separated from the sensitive separator region by the incision 10, 11, the thermal loading during the welding process does not lead to damage to the separators 5. As an alternative or in addition, the electrical connection can also be made by mechanical processing, for example deformation or radial pinching.

Figure 2:
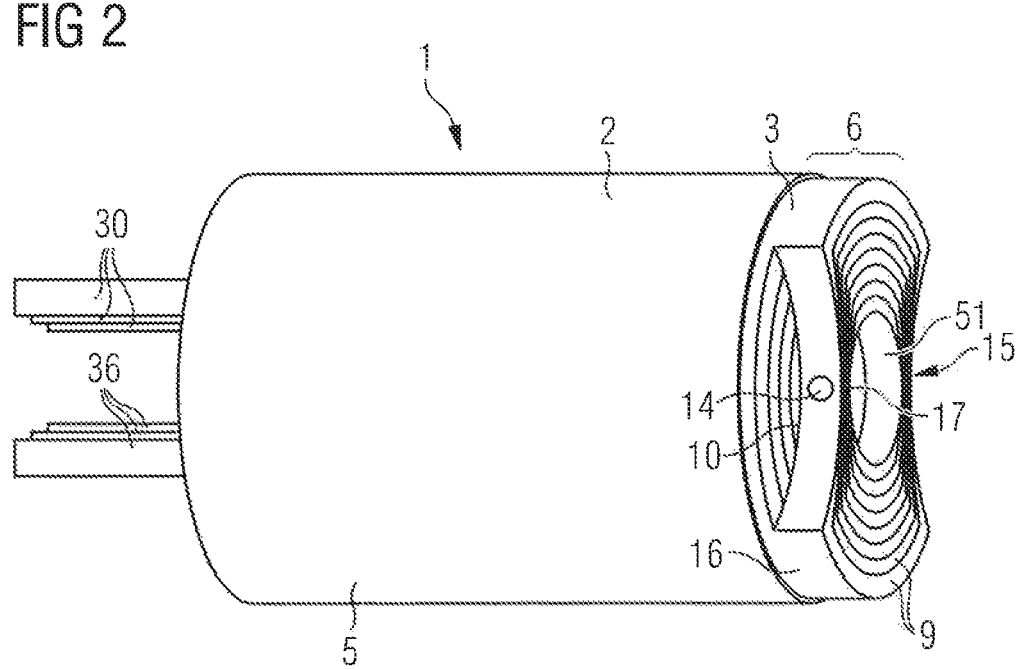
FIG. 2 shows a further embodiment of a capacitor in a perspective side view.

FIG. 2 shows a further embodiment of a capacitor 1 with directly electrically connected layers 9 of the cathode foil 3 in the projection region 6.

In contrast to the embodiment from FIG. 1, the incisions 10, 11 each pass through all of the layers 9, in particular from the outermost layer 16 to the innermost layer 17, in the present case. Similarly, all of the layers 9 are directly electrically connected to one another at the contact points 14, 15.

It is also possible for the incision 10, 11 to not pass through all of the layers 9, but for the contact point 14, 15 to affect all of the layers 9 if a degree of flexibility in some of the layers 9, in particular in the outer layers, is sufficient for bundling the layers 9.

A further difference from FIG. 1 is the manner of contact-connection. A plurality of cathode contacts 30 and anode contacts 36 which are electrically connected to the cathode foil 3 and, respectively, the anode foil 4 in the winding are formed here. The cathode contacts 30 and anode contacts 36 are designed as strips. The cathode contacts 30 are connected to a common cathode connection (not illustrated here) and the anode contacts 36 are connected to a common anode connection (not illustrated here).

The embodiments of FIGS. 1 and 2 have a so-called radial design in which the connections 7, 8 are arranged on the same side of the winding 2. In the case of capacitors 1 of this design with hybrid polymer technology with highly conductive solid electrolytes, the cathode foil resistance already dominates given diameters of 10 to 12 mm, and therefore a considerable reduction in the ESR can already be achieved in this size range by the direct connection of the cathode layers at contact points.

Figure 3A:
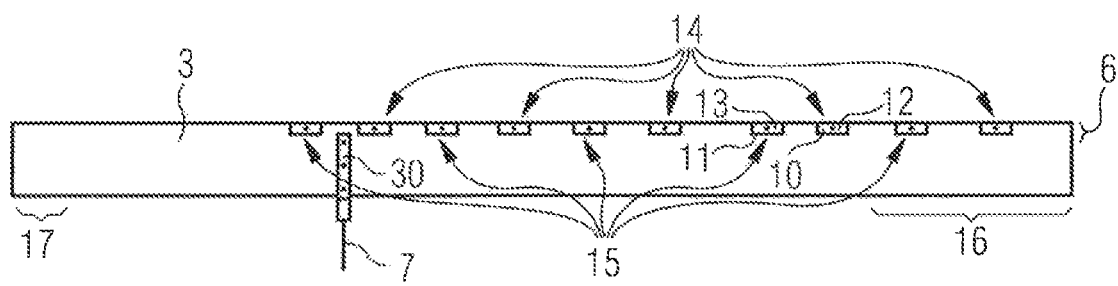
FIGS. 3A and 3B show a cathode foil of the capacitor from FIG. 1 in wound form and with a schematically illustrated current flow.
Figure 3B:
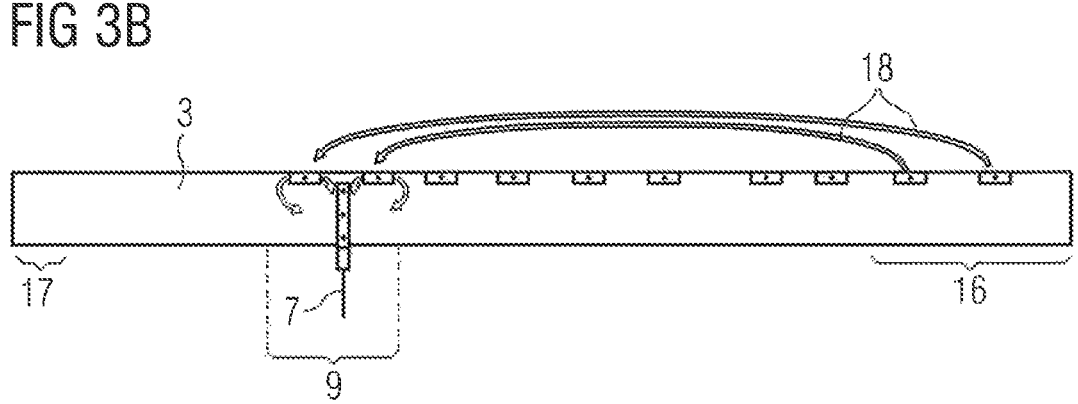

FIG. 3A shows the cathode foil 3 of the capacitor 1 from FIG. 1 in unwound or unrolled form. FIG. 3B shows a schematic illustration of the current flow 18 from the outermost layer 16 to the connection 7. The first incisions 10 are present in an alternating sequence with the second incisions 11. Similarly, the contact points 14, 15 alternate.

Owing to the direct connection of the layers via the contact points 14, 15, low-impedance current paths are produced, and therefore the current flow 18 can take place directly radially to the inside via the contact points 14, 15. In particular, the current flow 18 takes place from the outermost layer 16 to the layer on which the cathode contact 30 is arranged. Therefore, an alternating current flows back with low inductance via the "bypasses" to the connection 7 since it has flowed through the winding far away from the winding center.

The incisions 10, 11 and the contact points 14, 15 do not extend as far as into the innermost layer 17. In this case, the innermost layer 17 is the layer which is situated closest to the winding center. Since the cathode contact 30 is not arranged laterally centrally on the cathode foil 3, but rather closer to the edge of the winding center edge than to the opposite edge of the cathode foil 3, the greatest effect in the reduction of the ESR is achieved by the bypasses of the outermost layer 16 and layers adjacent thereto on account of the long current paths. In the case of capacitors 1 with a radial design, the non-central arrangement of the cathode contact 30 can be advantageous in order to be able to locate a position of the connection 7 at a sufficient distance from a housing of the capacitor.

Therefore, it may be sufficient for only the outer layers 9 of the cathode foil 3 to be connected to one another by the contact points 14, 15. For example, this may be sufficient for capacitors with diameters of between 18 and 20 mm. In the case of capacitors with a large diameter, for example a diameter of more than 20 mm, it may be advantageous to connect all of the layers 9 by means of at least one contact point 14, 15.

In the case of contact-connection by means of a plurality of cathode contacts 30 according to FIG. 2, the cathode contacts 30 are arranged in different positions on the cathode foil 3. For example, the cathode contacts 30 in the winding 2 are arranged on the same side with respect to the winding center in a uniform angular position and in different radial positions. In this case, it may be expedient to form a plurality of individual bundles from layers 9 which are each located closest to a cathode contact. For example, in each individual bundle, one cathode contact 30 is arranged in the center of the individual bundle. Therefore, there can be one cathode bundle for each cathode contact. This may be advantageous, in particular, for very thick windings.

Figure 4A:
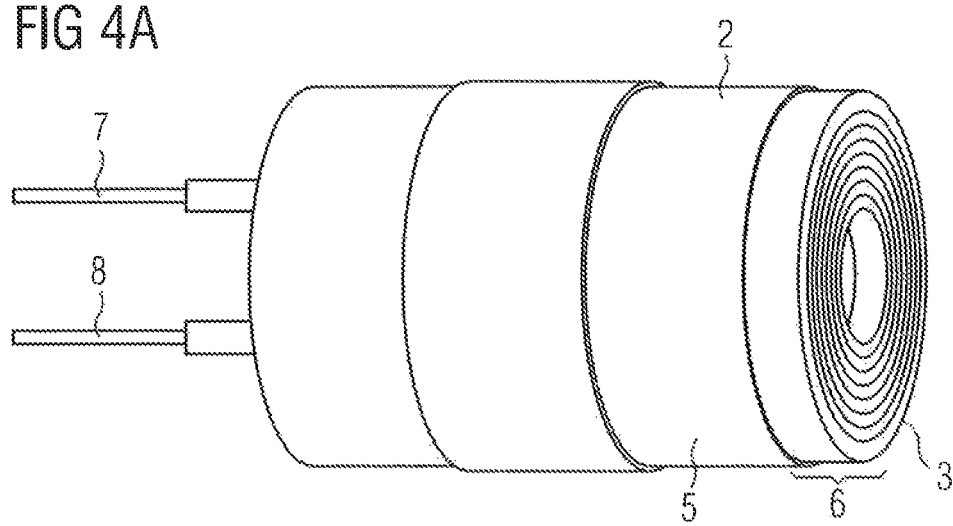
FIGS. 4A to 4C show method steps for the production of a capacitor.
Figure 4B:
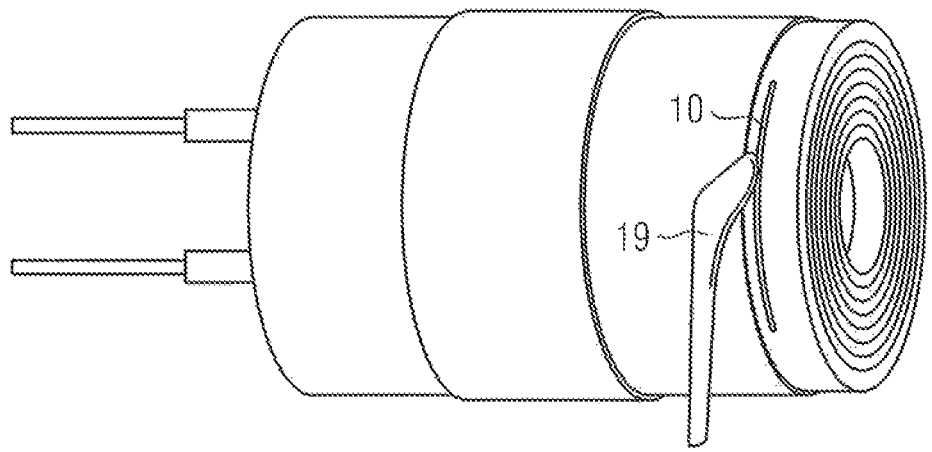
Figure 4C:
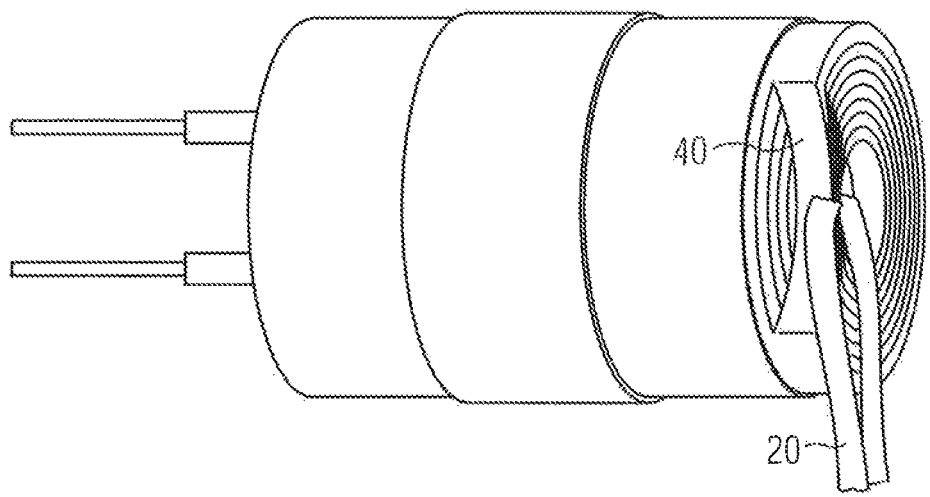

FIGS. 4A to 4C show method steps in the production of a capacitor 1, for example the capacitor 1 from FIG. 1.

According to FIG. 4A, a winding 2 having a cathode foil 3, an anode foil 4 (see FIG. 5A) and separators 5 is provided. The winding 2 has a projection region 6 in which the cathode foil 3 projects beyond the anode foil 4 and the separators 5. The capacitor 1 has connections 7, 8 for electrical connection.

In the capacitor 1, an incision 10 is made in the projection region 6 from the outside according to FIG. 4B. The incision 10 is made by means of a cutting tool 19, for example a blade. The incision 10 passes through sub-regions of a plurality of adjacent layers 9 of the cathode foil 3.

As is schematically illustrated in FIG. 4C, the layers 9 which are provided with incisions 10 are then pressed together at one point and bundled in this way. Bundling takes place, for example, with a set of tongs 20. The layers 9 can also be electrically connected to one another in the bundle 40 in the same method step. For example, a spot welding process is carried out with the aid of the set of tongs 20 here.

Other methods for direct electrical connection can also be used here, for example other welding processes or else contact-connection by mechanical deformation.

One or more further incisions and contact points, for example an incision 11 and a contact point 15 on a opposite side of the winding 2 as shown in FIG. 1, can be made subsequently to or else before the method step of bundling and electrical contact-connection.

FIG. 5A shows a further embodiment of a capacitor 1. Said figure depicts a winding 2 of a capacitor 1 which is embodied as shown in FIG. 1. The capacitor 1 is shown in a longitudinal section, wherein the winding 2 is rotated through 90° about the winding axis 100 in comparison to FIG. 1.

Said figure illustrates the housing 21 in which the winding 2 is arranged. The housing 21 is designed, in particular, as a can with a base 23 and a housing opening 28. The housing opening 28 is closed by a cover 29. Said cover may be a rubber plug and a hard paper disk.

Incisions 10, 11 are made in the layers 9 of the cathode foil 3 on opposite sides in the projection region 6. The movable strips 12, 13 which are formed as a result are bundled and electrically connected at two contact points 14, 15.

In contrast to the capacitors 1 of FIGS. 1 and 2, contact is not made with the cathode foil 3 via cathode contact 30, which is contact-connected to the cathode foil 3 within the winding 2, in the present case. Rather, the contact points 14, 15 of the bundle 40, 41 are electrically connected to the base 23 of the housing 21, and therefore the current is guided to the housing 21. This renders possible low-inductance guidance of the current and therefore causes a reduction in the ESL).

For example, the bundles 40, 41 of the cathode foil 3 are connected to a connecting piece 24 and the connecting piece 24 is electrically connected to the base 23 of the housing. The connecting piece 24 encloses each bundle 40, 41, for example as a clamp 25, and connects the bundles 40, 41 via a web 26.

The clamps 25 are electrically connected, in particular welded, to the bundles 40, 41. The web 26 is electrically connected, in particular welded, to the base 23 of the housing 21. To this end, the base 23 has a raised portion 27 which points to the inside. The connecting piece 24 is, for example, strip-like. The connecting piece 24 contains, for example, a metal, in particular aluminum. The connection to the base 23 can be produced, for example, by means of a welding electrode which is passed through the housing opening and the central winding hole.

Therefore, the bundles 40, 41 with the contact points 14, 15 serve not only for internal electrical connection of the layers 9 of the cathode foil 3 but also for electrical connection to the base 23 via the connecting piece 24.

Therefore, the current is conducted from the cathode foil 3 via the housing 21. For electrical connection, a connection 7 is electrically connected to the housing 21 from the outside for example. Said connection may be, in particular, a so-called "solder star", that is to say an annular plate which is fastened to the outside of the housing. Said connection may also be a so-called "insert star" which is fastened within the housing 21, in particular to the beading. The insert star can be welded on the housing 21.

In this way, it is possible to use two connections 8, which protrude out of the housing opening 28 in different positions and are guided through the cover 29, for electrically contact-connecting the anode foil 4. For example, the connections 8 are situated opposite one another with respect to the winding center. The connections 8 can be at different distances from the winding axis 100. Therefore, one of the connections can be used for making contact with a region of the anode foil 4 that is situated closer to the winding axis 100, and the further connection can be used for making contact with a region of the anode foil 4 which is situated further away from the winding axis 100. The connections 7, 8 can be connected to a printed circuit board.

Figure 5B:
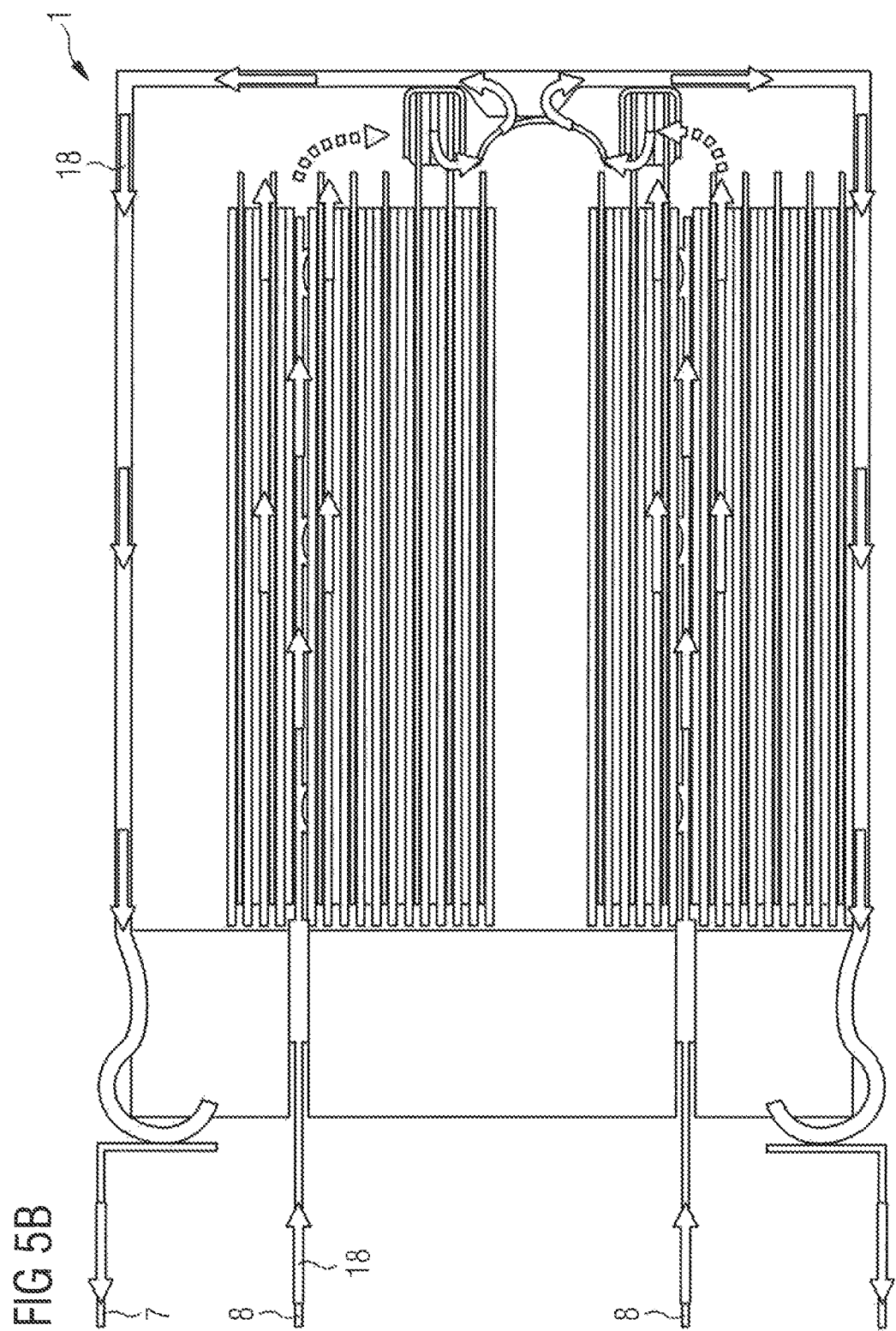

FIG. 5B schematically shows the current flow 18 in the capacitor 1 from FIG. 5A. FIG. 5C schematically shows the current flow 18 from the bundles 40, 41, via the connection piece 24, to the base 23 of the housing 21.

As can be seen in FIGS. 5A and 5B, the winding 2 is installed in an asymmetrical manner, and therefore the anode contacts 36 are arranged in different radial positions. The asymmetrical installation requires a larger housing 21. Owing to suitable measures such as an asymmetrical cover 29 and asymmetrical connections 8 for example, the winding 2 can also be arranged in a symmetrical manner in the housing 21, and therefore an enlarged housing 21 is not required.

In the case of the capacitor 1 shown in FIGS. 5A to 5C, a connection 7 for making contact with the cathode foil 3 and two connections 8 for making contact with the anode foil 4 are arranged on the same end side of the capacitor 1. The anode connections 8 extend through into the opening 28 of the housing 21 and are connected to the anode foil 4 within the winding 2. Therefore, there is a double positive contact-connection of the capacitor 1.

In the normal case, this is not possible for capacitors 1 of the radial design shown on account of the increased space requirement. However, since the cathode connection 7 is not inserted into the housing 21 through the opening 28 in the case of the capacitor 1 shown here, the space can be used for a further connection 8 of the anode foil 4. In particular, two regular terminals, for example in the form of paddle tabs, can be used for a double contact-connection of the anode foil 4.

The double positive contact-connection renders possible the use of, in particular, capacitors 1 of radial design even given large diameters, for example diameters of 18 mm and more, for applications with a high alternating current. Owing to the double positive contact-connection, the path resistance of the anode foil can be considerably reduced. This leads to a reduction in the ESR. For example, in the case of capacitors with diameters>25 mm, the path resistance of the cathode foil and anode foil dominates the ESR. If the path resistance of the cathode foil has been reduced by the contact points 14, 15, only the path resistance of the anode foil still dominates, and therefore a great effect can be achieved by a double positive contact-connection here. For example, the path resistance can be reduced to a quarter by doubling the number of anode connections 8.

FIG. 6 shows an alternative embodiment of the connecting piece 24 for making contact with the strips 12, 13 which are arranged in the bundle 40, 42 to the base 23 of the housing 21. Here, the connecting piece 24 does not have any clamps 25, but rather is fastened only to one side of the bundles 40, 42 in each case.

FIG. 7 shows a further embodiment of a capacitor 1 with a schematically illustrated current flow 18.

In contrast to the capacitor of FIGS. 5A to 5C, a design with the strip-like anode contacts 36 is shown here, wherein a plurality of anode contacts 36 for connection to an anode connection 8 are in each case formed here. Said connection is, for example, a solder claw connection or screw terminal.

For example, in each case three anode contacts 36 are connected to one connection, and therefore a total of six anode contacts 36 for making contact with the anode foil 4 are formed. Contact is also made with the cathode foil 3 (negative contact-connection) via the base of a housing here.

Figure 8:
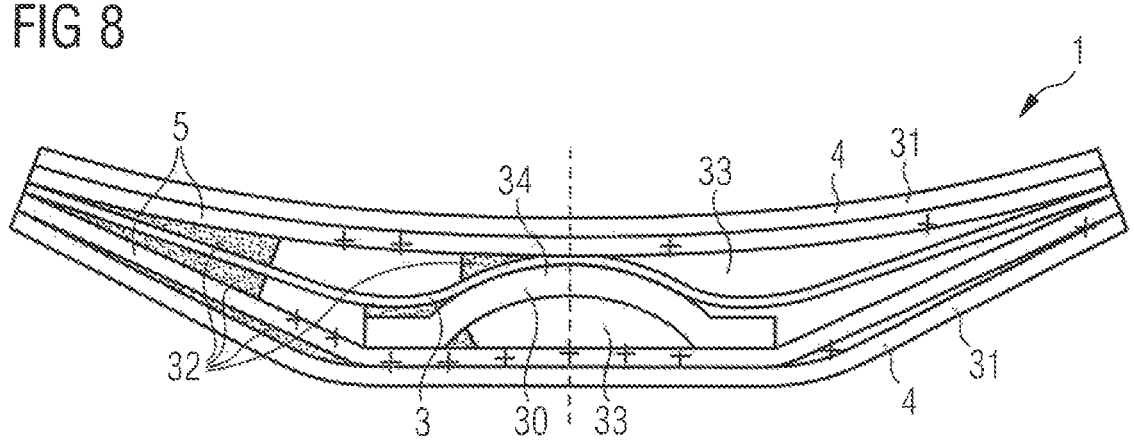
FIG. 8 shows a detail of a capacitor in cross section.

A further problem in the case of a capacitor 1 is explained with reference to FIG. 8. Said capacitor is an electrolytic capacitor. Said figure depicts a detail of a capacitor 1 in cross section. The capacitor 1 has, for example, the above-described contact points 14, 15. Said capacitor is, for example, the capacitor 1 from FIG. 1. The capacitor 1 can also not have the contact points 14, 15. In this case, the capacitor 1 is designed, for example, according to FIG. 4A.

Shown is here the arrangement of a cathode contact 30 for making electrical contact with the cathode foil 3. The cathode contact 30 is arranged between the cathode foil 3 and a separator 5. The cathode contact 30 is designed, in particular, in a strip-like manner, in particular as a metal strip. Additionally depicted are two layers 31 of the anode foil 4 and a further separator 5. The separators 5 are composed, for example, of paper and are impregnated with a liquid electrolyte 32.

The cathode contact 30 and the cathode foil 3 have a curved portion 34, and therefore a gap 33 in the form of a tunnel is formed below the cathode contact 30. The curved portion is produced, for example, by cold-welding the cathode contact 30. In addition, there can be further gaps 33 between the separator 5 and the cathode foil 3 and, respectively, between the separator 5 and the cathode contact 30. In contrast, the anode foil 4 bears largely against the separators 5.

The capacitor 1 is shown in two different states of aging in the present case. To the left of the dashed center line, the capacitor 1 is shown in a new state in which there is enough electrolyte 32 in order to fill the gaps 33 to a sufficient extent. Therefore, a large region of the separator 5 is in electrical contact with the cathode foil 3.

To the right of the dashed line, the capacitor 1 is already older and the gaps 33 are not filled with the electrolyte 32 to a sufficient extent. Therefore, a cavity is formed between the cathode foil 3 or the cathode contact 30 and the separator 5 here. These critical points are marked by crosses. Points of this kind are situated, in particular, in the tunnel-like gap 33 below the cathode contact 30.

Since the cathode contact 30 is not roughened, it has only a low specific surface capacitance and therefore has only a small influence on the separator potential or electrolyte potential in comparison to the anode foil 4. Therefore, the cathode contact 30 can keep the electrolyte 32 at the cathode potential only to a limited extent. Therefore, the region of the separator 5 below the curved portion of the cathode contact 30 is dominated by the anode foil 4. In the event of rapid and pronounced changes in voltage, the electrolyte potential of these regions of the separator 5 also changes. In contrast to the regions which are dominated by the anode foil 4, the electrolyte regions which are in contact with the cathode foil 3 have a virtually constant potential. These potential differences produce equalization currents which can change the capacitor 1 in a manner which is sometimes dangerous.

In particular in the event of high switching loads in use, the capacitors 1 can crack, corrode or deposits which lead to short circuits can form. In particular, copper crystals can form in the separator 5 in the cavities below the cathode foil 3. In addition to this, the gaps 33 can also lead to an increase in the ESR at low temperatures.

Figure 9:
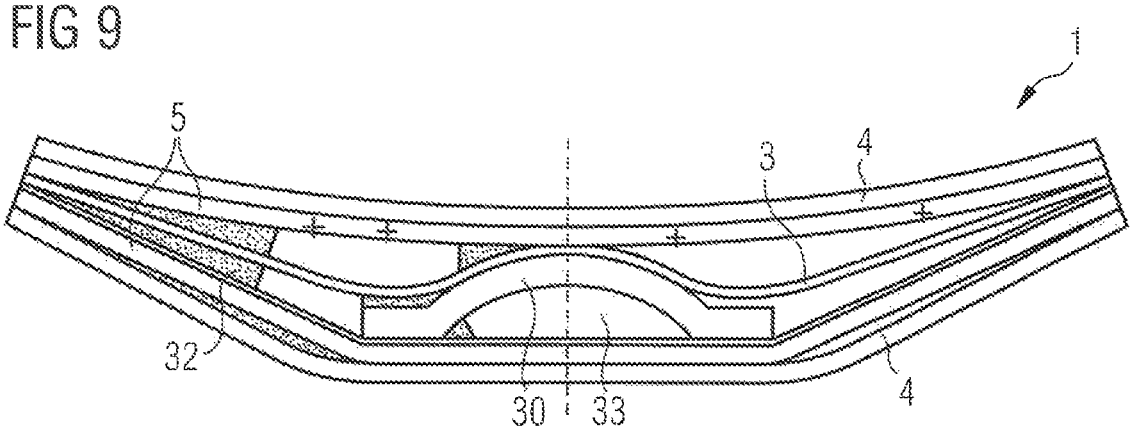
FIG. 9 shows a detail of a further capacitor in cross section.

FIG. 9 shows a detail of a capacitor 1 with a measure for solving the above-described problem.

In order to increase the switching strength, the cathode contact 30 is covered by means of an additional cathode foil 35 here such that the cathode contact 30 is arranged between two cathode foils 3, 35 which are at the same potential. The two cathode foils 3, 35 can be electrically conductively connected. However, dynamic coupling by means of surface oxide layers can also be sufficient in order to keep the two cathode foils 3, 35 at the same potential.

In this case too, the capacitor 1 is shown in the new state in the left-hand-side part of the image and the capacitor 1 is shown in the older state in the right-hand-side part of the image. In a new capacitor 1, there is enough electrolyte in order to fill the gaps 33 to a sufficient extent. Therefore, a large region of the separator 5 is in direct electrical contact with the cathode foil 3, so that the potential differences are reduced.

In an older capacitor 1, the gaps 33 are not filled with the electrolyte, and therefore there are cavities. The lower separator 5 is continuously well connected to the additional cathode foil 35, and therefore there are no critical points in the lower separator 5.

The upper separator 5 is also partially dominated by the anode foil 4 here. Therefore, the critical points which are marked by a cross remain.

A further advantage of these "double cathode foils" is that no significant currents flow or even flashovers are produced on account of the arrangement of the cathode contact 30 between two cathode foils 3, 35 due to the lack of real potential differences. Therefore, electrochemical changes in the electrolyte 32 or the surfaces can be reduced in this region. In addition, no flashover would occur in the event of damage to the separator 5, for example due to burrs, either.

A further, less effective alternative to the "double cathode foils" is that of using a cathode contact 30 with an artificially elevated surface. This cathode contact 30 can then better stabilize the separator 5 or electrolyte 32 which is located in the vicinity to cathode potential.

Figure 10A:
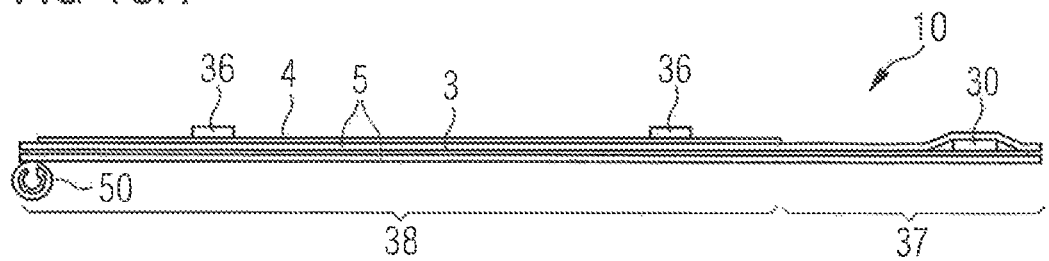
FIGS. 10A, 10B and 10C show foils of a further embodiment of a capacitor in an unrolled side view, an unrolled perspective view and in wound form in cross section.
Figure 10B:
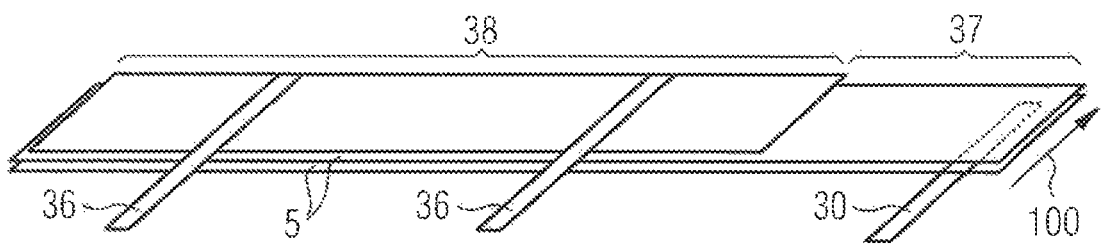

FIGS. 10A and 10B show an embodiment of a capacitor 1 in a side view of unrolled foils and in a perspective view of the unrolled foils. Therefore, said figures depict a foil arrangement 10 having a separator 5, a cathode foil 3, a further separator 5 and an anode foil 4 which are arranged one above the other, as would be present before the winding process or as would be present after unrolling the foils.

The capacitor 1 has, for example, the contact points in the overlap region according to FIG. 1. However, the capacitor 1 can also be formed without contact points of this kind, like the capacitor from FIG. 4A for example.

A winding mandrel 50 and there the winding direction of the winding mandrel 50 are illustrated for the purpose of demonstrating the formation of the winding 2 from the foil arrangement 10. Therefore, that region of the foil arrangement 10 which is situated on the far left in the figure comes to rest in the vicinity of the winding hole. That region which is situated on the far right in the figure forms the radially outer edge of the winding 2.

In the illustrations shown, the anode foil 4 is arranged right at the top in order to better illustrate the positioning. The capacitor 1 has anode contacts 36 which are arranged in different positions on the anode foil 4. The anode contacts 36 are designed in a strip-like manner. Here, the anode contacts 36 are designed as a multiple contact-connection of the anode, as can also be seen in FIG. 2 for three anode contacts 36 for example.

The foil arrangement 10 has an overlap-free region 37 in which the cathode foil 3 is not covered by the anode foil 5. In other words, in a plan view in the unrolled state, there is no overlap of the cathode foil 3 with the anode foil 5 in the overlap-free region 37. The overlap-free region 37 laterally adjoins a region 38 in which the cathode foil 3 and the anode foil 5 overlap. The lateral direction runs horizontally in the figure. The separators 5 and the cathode foil 3 are present in the overlap-free region 37.

The cathode contact 30 is arranged in the overlap-free region 37. In this way, the formation of critical points as described in connection with FIGS. 2 and 3 can be reduced or prevented. In particular, there are fewer gaps 33 in which the separator 5 is in direct contact with the anode foil 4, but not with the cathode foil 3. Ideally, all of the regions of the separator 5 which is impregnated with electrolyte, which regions is contact by the anode foil 4, are also contacted by the cathode foil 3.

Therefore, the cathode contact 30 is not arranged at a point at which the cathode foil 3 overlaps with the anode foil 4. As a result, formation of local electrolyte regions with a different potential can be prevented. This is important particularly in the case of rapid charge-reversal processes or changes in voltage. For example, a capacitor 1 of this kind can be permanently exposed to AC voltages up to the rated voltage if the alternating current does not lead to thermal overloading here.

In addition, it is possible on account of the arrangement of the cathode contact 30 in the overlap-free region 37 to design the separator 5 to be weaker or thinner since it does not have to perform a function of protecting the cathode contact 30 from the anode foil 4. This leads to a further reduction in the ESR.

In addition, "current diversions" and therefore also the ESR are reduced owing to the reduction in gaps between the anode foil 4 and the cathode foil 3. This is significant in particular at low temperatures at which the electrolyte volume can no longer fill the gaps to a sufficient extent.

The capacitor 1 additionally has anode contacts 36 which are arranged in different positions on the anode foil 4. The anode contacts 36 are designed in a strip-like manner. Here, the anode contacts 36 are designed as a multiple contact-connection of the anode, as can also be seen, for example, in FIG. 2 for three anode contacts 36.

In the present case, the overlap-free region 37 extends from an end-side edge of the cathode foil 3, along the winding axis 100, to the opposite end-side edge of the cathode foil 3. However, it is also conceivable for the overlap-free region 37 to not extend as far as the opposite edge.

The overlap-free region 37 is present in a lateral edge region of the cathode foil 3. However, other positions can also be realized, as will be explained later in connection with FIGS. 12A, 12B, 12C and 13. The overlap-free region 37 extends over more than one turn in the winding 2 in the lateral direction. In this case, the gap problem can be avoided in both radial directions. As an alternative, the overlap-free region 37 can extend only over at most one turn in the winding 2, as a result of which the gap problem is then avoided only in one radial direction.

In this case, the overlap-free region 37 can be situated in the winding 2 in a radially outer region of the capacitor 1 or in a central region of the capacitor 1, irrespective of which lateral edge the region 37 is formed on. The radial direction runs perpendicularly to the winding axis 100 in the winding 2. The lateral direction runs in a spiral manner along a foil in the winding 2.

On account of the arrangement of the cathode contact 30 on the lateral edge of the cathode foil 3, the path resistance of the cathode foil 3 increases in comparison to an arrangement centrally on the cathode foil 3. This can be accepted if the switching strength of the capacitor 1 is important and the path resistance is less so or if the capacitor 1 is so small that the path resistance is negligible.

Figure 10C:
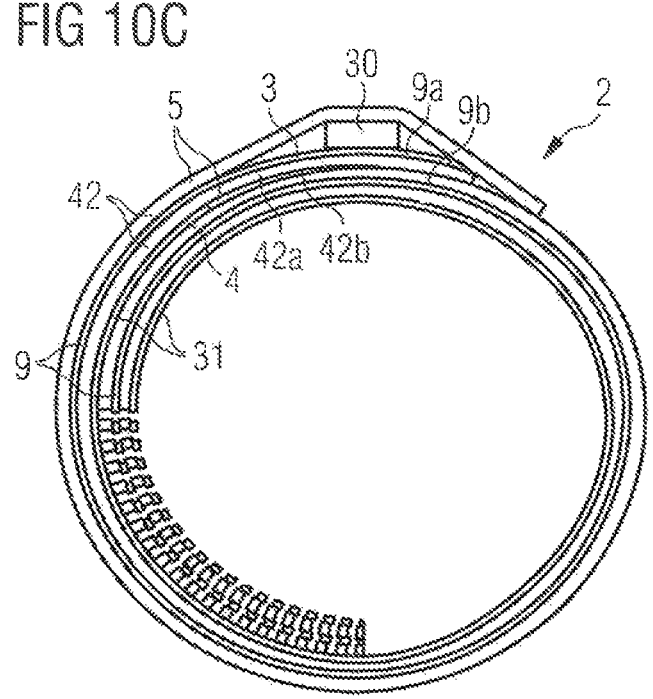

FIG. 10C shows the foil arrangement from FIGS. 4A and 4B in wound form in cross section. Only an outer region of the winding 2 is shown here. The anode contacts 36 are not depicted here.

A plurality of layers 9 of the cathode foil 3 (also referred to as cathode layers 9), layers 42 of the separators 5 (also referred to as separator layers 42) and layers 31 of the anode foil 4 (also referred to as anode layers 31) are depicted. In this case, the region of a foil which is arranged within a winding is referred to as a "layer". Various layers are regions of a cathode foil and, respectively, an anode foil and, respectively, of the separators which are arranged one above the other in the radial direction. In the separator layers, the two separators are not considered separately, and therefore two separator layers can belong to one of the separators or to different separators.

Owing to the formation of the overlap-free region 37, the cathode contact 30 is covered from the outside only by a separator foil 5, but not by the anode foil 4. The overlap-free region 37 extends over more than one winding. In other words, the overlap-free region 37 extends over more than one cathode layer 9. In particular, the overlap-free region 37 is present in the cathode layers 9a, 9b which are closest to one another. Therefore, there is no anode foil 4 between two closest separator layers 6a, 6b here.

In particular, an anode foil 4 does not adjoin the separator layer 6a which is closest to the cathode contact 30 in a direction radially to the inside.

Therefore, in the winding 2, the sequence of the layers 6, 9, 31 in the radial direction from the outside to the inside in the region of the cathode contact 30 is as follows: separator layer 42-cathode contact 30-cathode layer 9a-separator layer 42a-separator layer 42b-cathode layer 9b-separator layer 42-anode layer 31, and so on.

It is also possible to design the separators 5, for example to provide said separators with recesses, in such a way that two separator layers 42a, 42b do not adjoin one another, but rather only one separator 5 is located between the two adjacent cathode layers 9a, 9b.

If the overlap-free region does not extend from the cathode contact 30 over more than one turn, the anode foil 4 adjoins the separator layer 42a which is closest to the cathode contact 30 in a direction radially to the inside. In this case, the gap problem is eliminated only in one radial direction, in particular radially to the outside. This may be sufficient for certain cases already.

In this case, the arrangement of the layers 42, 9, 31 in the radial direction from the outside to the inside in the position of the cathode contact 30 is as follows: separator layer 42-cathode contact 30-cathode layer 9a-separator layer 42a-anode layer 31, separator layer 42, cathode layer 9, and so on.

FIG. 11A shows a further embodiment of a capacitor 1, in which the embodiments with a bundle 40 and a contact point 14 in a projection region 6 is combined with the embodiment of the cathode contact 30 in the overlap-free region 37. FIG. 11B shows this embodiment with a schematically indicated current flow.

The overlap-free region 37 is arranged at the edge of the capacitor 1. The overlap-free region 37 can be seen in the winding 2 in that here a layer 9a of the cathode foil 3 is not adjacent to a layer of the anode foil 4 in the radial direction—with separation by separators 5 and the cathode contact 30, but rather that a layer 9a of the cathode foil 3 is adjacent to a further layer 9b of the cathode foil 3—in each case with separation by separators 5 and the cathode contact 30. Therefore, two separator layers 42a, 42b are arranged between the two cathode layers 9a, 9b, wherein the separator layers 42a, 42b directly adjoin one another. Each region of the separator 5 which is in contact with the anode foil 4 or the anode contact 36 is also in contact with the cathode foil 3.

In contrast to FIGS. 10A and 10B, the cathode contact 30 passes out at the other end-side face of the winding 2 to the anode contacts 36. The cathode contact 30 is bent in the direction of the winding center outside the winding 2. In particular, the cathode contact 30 is passed to a raised portion 27 in a central region in the base 23 of the housing 21 and is electrically connected, in particular welded, to the housing 21 there. The capacitor 1 is designed, in particular, as an axial capacitor.

Furthermore, in contrast to the capacitor from FIG. 10C, the winding mandrel 50 is arranged above the foil arrangement 10 according to FIG. 10A here when forming the winding 2.

In order to reduce the path resistance of the cathode foil 3, layers of the cathode foil 3 are bundled in the projection region 6 and directly connected to one another at a contact point 14, analogously to FIG. 1, wherein in the present case a bundle 40 and a contact point 14 is formed only on one side of the winding center. Therefore, the path resistance of the cathode foil 3 is low in spite of the outside position of the cathode contact 30. The path resistance of the anode foil 4 is reduced by a double contact-connection by means of two anode contacts 36. Therefore, overall, the capacitor 1 has a high degree of homogeneity with a low path resistance.

FIG. 11B schematically shows the current flow 18 during the charging process in the capacitor from FIG. 11A. The current flows through the anode contacts 36 into the winding 2. During outflow, the current flow 18 takes place via the cathode foil 3 in the direction of the end face of the winding. There, the current flows to the central contact point 14 and then further on the outermost layer 16 of the cathode foil 3 to the cathode contact 30. The current flows to the base of the housing (not depicted here) via the bent cathode contact 30 outside the winding 2.

Figure 12A:
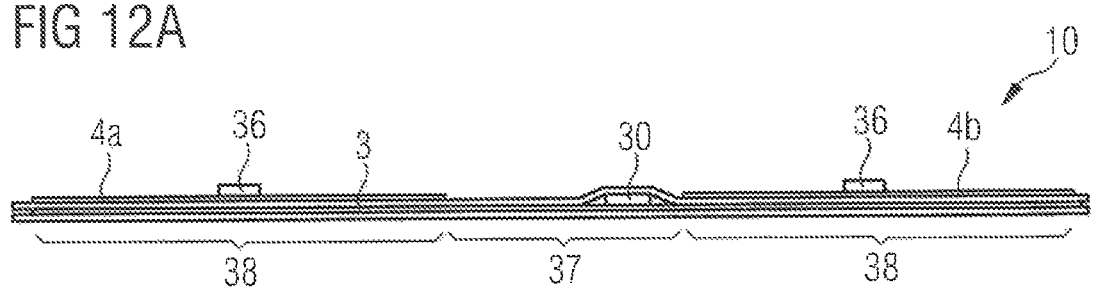
FIGS. 12A, 12B and 12C show unrolled foils of a further embodiment of a capacitor in a side view and a perspective view and in wound form in cross section.
Figure 12B:
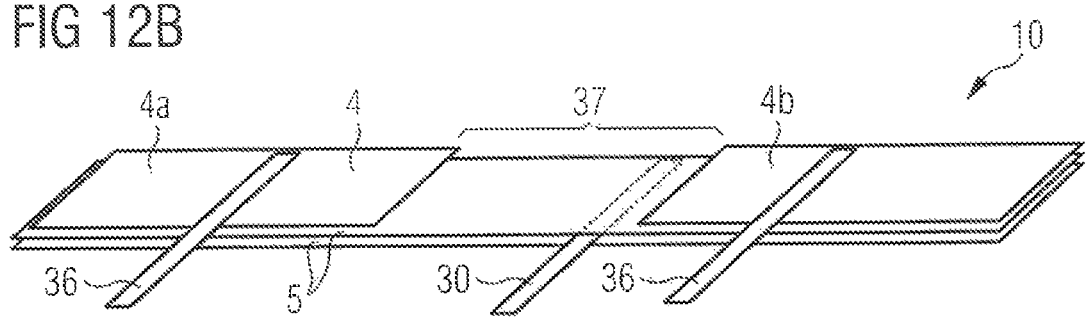

FIGS. 12A and 12B show a further embodiment of a capacitor illustrated by a foil arrangement 10 of the unrolled foils in a side view and a perspective view.

In contrast to the embodiment of FIGS. 10A, 10B and 10C, the overlap-free region 37, in which the cathode contact 30 is arranged, is not located on the lateral edge of the cathode foil 3, but rather in a laterally central region of the cathode foil 3. Overlapping regions 38 in which the anode foil 4 overlaps with the cathode foil 3 adjoin either side of the overlap-free region 37.

The overlap-free region 37 extends from an end-side edge of the foils as far as the opposite end-side edge of the foils here too.

Therefore, the anode foil 4 is broken down into two partial foils 4a, 4b which are not connected to one another. In this case, it is necessary to separately contact-connect each partial foil 4a, 4b to an anode contact 36.

Owing to the central arrangement of the cathode contact 30, the path resistance (ESR) changes only slightly in this design.

The overlap-free region 37 extends over more than one turn in a lateral direction as seen from the cathode contact 30. In this case, the gap problem can be eliminated in both radial directions.

Figure 12C:
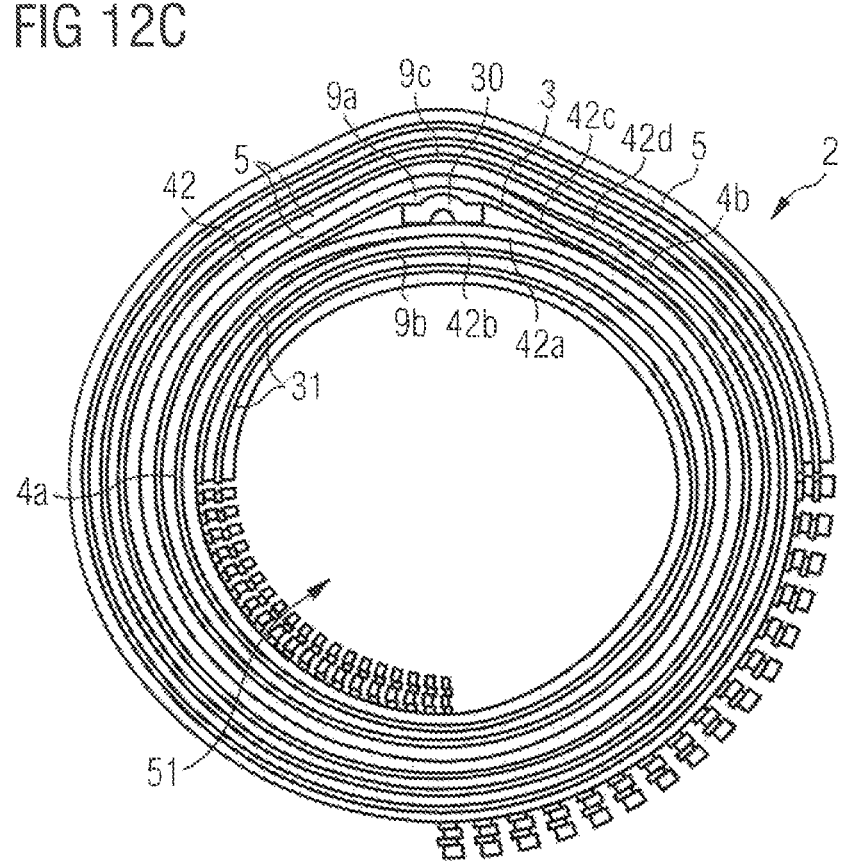

FIG. 12C shows the foils in wound form in cross section. In contrast to the embodiment of FIG. 10C, the cathode contact 30 is arranged between a large number of separator layers 42, cathode layers 9 and anode layers 31 in both lateral directions. Furthermore, in contrast to FIGS. 10A-10C, the winding is designed with a winding mandrel, which is situated above the foil arrangement 10 in FIG. 12A, here. In an alternative embodiment, the winding is designed with a winding mandrel which is situated below the foil arrangement 10.

There is no anode foil 4 between the cathode layer 9a against which the cathode contact 30 bears and the cathode layers 9b, 9c, which are closest to said cathode contact to the outside and to the inside, in the region of the cathode contact 30 in the wound state.

Instead of this, in each case two separator layers 42a, 42b and, respectively, 42c, 42d bear directly against one another. In particular, two separator layers 42a, 42b are directly adjacent to one another in a manner adjoining the cathode contact 30 in the radial direction to the inside, that is to say as seen in the direction of the winding hole 51, and therefore neither a cathode layer 9 nor an anode layer 31 is arranged therebetween. The separator layers 42c, 42d which are closest to the cathode contact 30 are directly adjacent to one another as seen in the radial direction to the outside too.

Furthermore, there is no anode foil 4 respectively between the cathode layer 9a against which the cathode contact 30 bears and the cathode layers 9a, 9b, which are closest to said cathode contact in the radial direction to the inside and the outside, in the region of the cathode contact 30.

As an alternative to the extent of the overlap-free region 37 over the circumference of the winding 2, the overlap-free region 37 can also be of narrow design at the location of the cathode contact 30 and a further overlap-free region 37 can be provided in a position which is arranged below or above the cathode contact 30 in the winding 2.

FIG. 13 shows a further embodiment of a capacitor illustrated by unrolled foils in a perspective view.

In contrast to the embodiment of FIGS. 12A and 12B, the overlap-free region 37 is not completely formed from one first end-side edge to the opposite end-side edge, but rather passes only slightly along from the first end-side edge in the direction of the opposite edge. For example, the overlap-free region 37 is formed by stamping out a region of the anode foil 4. Therefore, the overlap-free region 37 is formed by a recess in a coherent anode foil 4.

Here, the cathode contact 30 is shortened in comparison to the cathode contact 30 of FIG. 12A, and therefore said cathode contact does not extend into the overlapping region 38.

Therefore, the anode foil 4 is not broken down into separate parts here, and therefore a single anode contact 36 for making contact with the anode foil 4 is sufficient. A plurality of anode contacts 36 can also be provided here in order to reduce the path resistance.

The capacitor 1 can also have a plurality of overlap-free regions 37, for example even a combination of overlap-free regions 37 at the lateral edge, for example according to FIG. 10A, and in the central position, for example according to FIG. 12A or 13.

Figure 14A:
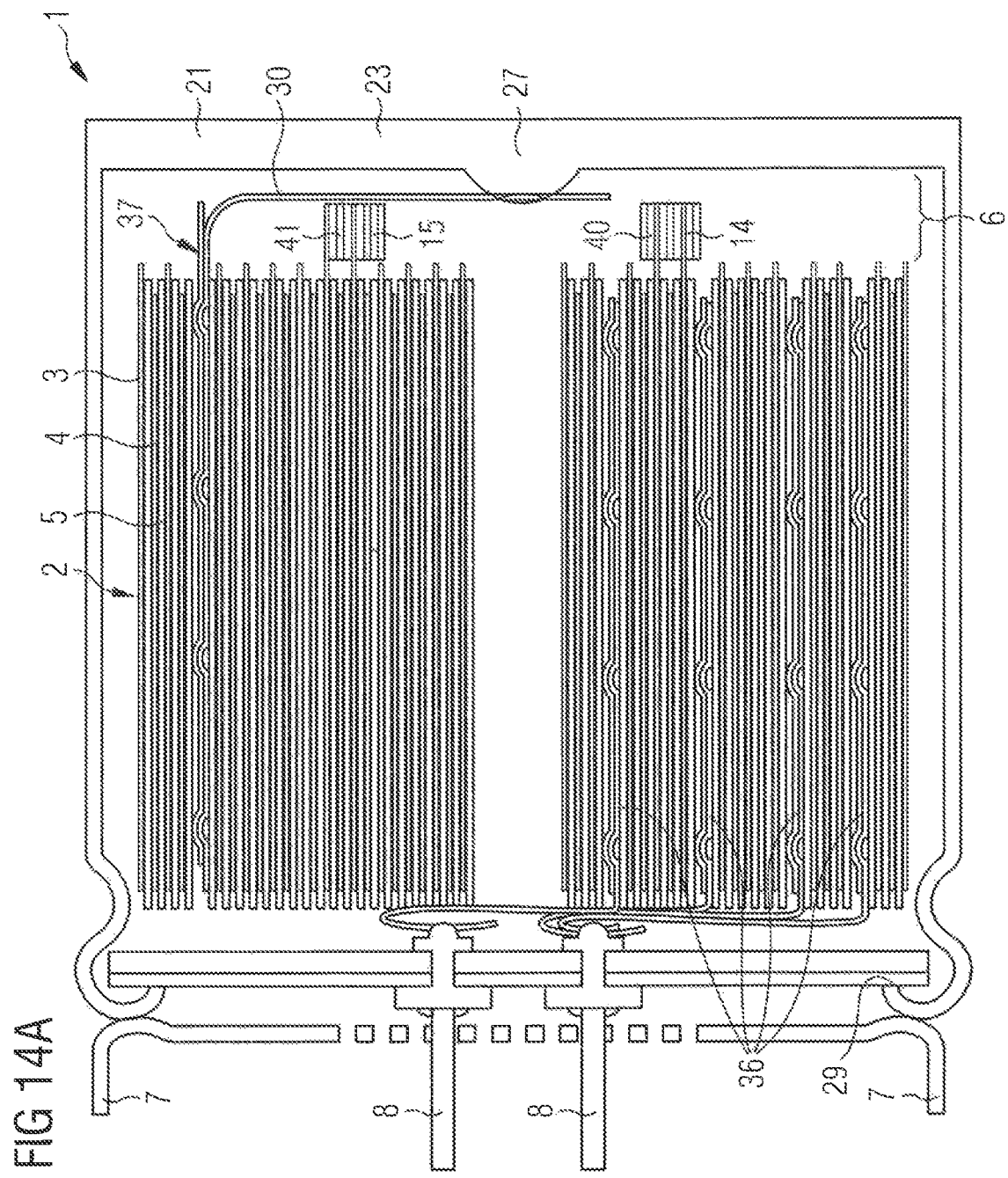

FIGS. 14A and 14B show a further embodiment of a capacitor 1, which further embodiment is designed in a similar manner to FIG. 11A.

In contrast to FIG. 11A, the cathode foil 3 is bundled to form two bundles 50, 51 with central contact points 50, 51 in the projection region 6.

Furthermore, there are four anode contacts 36 in the present case, which four anode contacts are connected to two anode connections 8. The anode connections 8 are connected to the anode contacts 36 via bushings through the cover 29. The anode connections 8 can be connected, for example, to a printed circuit board.

Analogously to FIG. 11A, the cathode contact 30 is arranged in an overlap-free region 37 which, however, is not situated entirely on the lateral edge of the cathode foil 3 here. The cathode contact 30 is also connected to the housing 21 here. The cathode connections 7 are formed by a solder star.

Figure 15A:
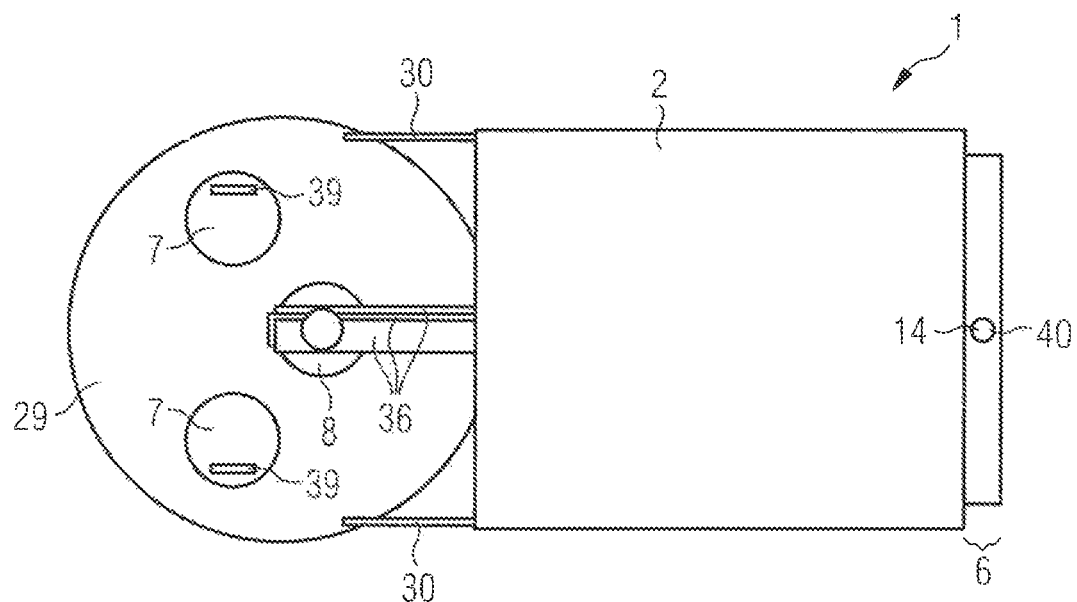
FIGS. 15A and 15B show a further embodiment of a capacitor in a side view before and after connection of a cathode contact.
Figure 15B:
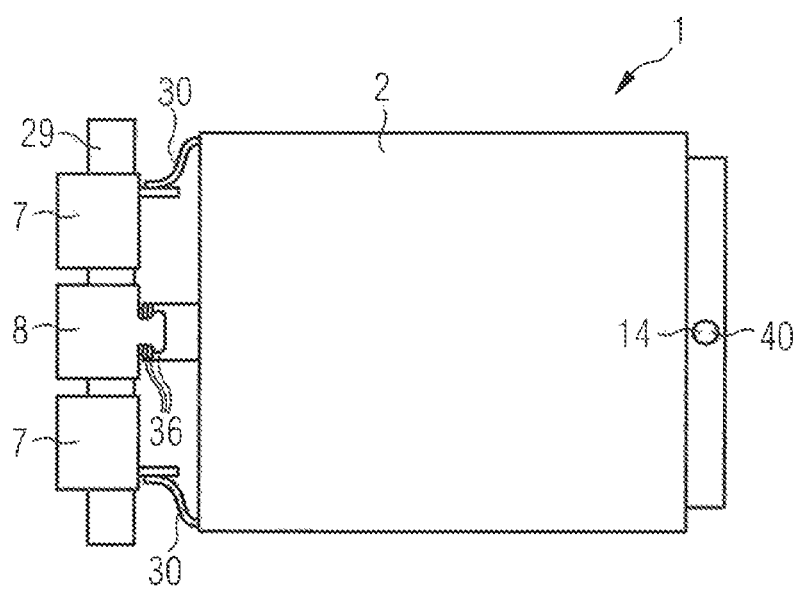

The current flow 18 in the capacitor 1 from FIG. 15A is schematically illustrated in FIG. 15B.

On account of the plurality of anode connections 8 and cathode connections 7, the current is split, and therefore the magnetic field density is halved in comparison to only one anode connection 8 and one cathode connection 7. Therefore, this capacitor 1 has only approximately half the self-inductance in comparison to single terminals. As a result, a low impedance can be achieved given high frequencies in which the inductance dominates.

FIGS. 16A and 16B show a further embodiment of a capacitor 1 with at least one central contact point 14 in the projection region 6, for example analogously to FIG. 1 or 2. Said capacitor is a capacitor 1 of radial design.

Contact is made with the cathode foil 3 by two cathode contacts 30 in the winding 2. The cathode contacts 30 are situated opposite one another with respect to the winding center. The cathode contacts 30 are arranged far on the outside in the radial direction. Said cathode contacts can be relatively wide and long strips. The cathode contacts 30 can, but do not have to, be arranged in an overlap-free region. On account of the central contact point 14, a low ESR can be achieved in spite of the decentralized arrangement of the cathode contacts 30 in the vicinity of the side face.

The cathode contacts 30 are each designed for connection to a cathode connection 7 (negative connection). In the present case, the cathode connections 7 are designed as screw terminals and have lugs 39 for making contact with the cathode contacts 30. In FIG. 16A, the respective cathode contact 30 is not yet connected to the cathode connection 7.

The anode connection 8 (positive connection) is formed, for example, by a regular screw terminal. There can also be two anode connections 8 of this kind which are formed, for example, by the regular screw terminals. The anode connection 8 is connected to a plurality of anode contacts 36. The anode contacts 36 are arranged, for example, in an angular position relative to the winding axis through +/−90° relative to the cathode contacts 30.

For example, the anode contacts 36 are first connected to the anode connection 8, as shown in FIG. 16A. The cover 29 is then turned in relation to the winding 2 and the cathode contacts 30 are connected to the lugs 39 of the cathode connections 7, as shown in FIG. 16B.

Therefore, there are a plurality of negative paths and possibly a plurality of positive paths, and therefore the current is split as in the case of a parallel circuit and the inductance is halved. This halved inductance for the interior of the capacitor 1 can also be continued on the outside during the wiring up, for example by low-inductance contact-connection with three rails which can be designed approximately coaxially.

In addition, the generation of heat in the connections (terminals) 7, 8 and the contacts 30, 36 can be reduced owing to the splitting of the current. In particular, the cathode contacts 30 between the winding and the housing are cooled and the heat is discharged directly to the housing without diversions.

This embodiment is advantageous, for example, particularly in electrolytic capacitor batteries comprising large screw-terminal electrolytic capacitors. In batteries of this kind, fewer capacitors which are connected in parallel are required on account of the size of the capacitors. However, the low number has the disadvantage of a high battery inductance. The self-inductance can be reduced owing to the additional terminals.

The embodiments described in the figures with bundles 40, 41 of the cathode foil 3 in a projection region 6 and/or the arrangement of the cathode contact 30 in an overlap-free region 37 of the cathode foil 3 can be used individually or in combination in different capacitors 1. For example, embodiments of this kind are present in capacitors 1 of axial design. Here, the cathode foil 3 is electrically connected to the housing 21. Other designs, for example designs which expand on the axial design, such as for example the designs with a perpendicular or horizontal solder star, horizontal press-fit or SMD, can also be embodied in this way.

Embodiments of this kind can particularly advantageously also be present in high-voltage capacitor batteries. Capacitors of this kind are generally constructed from snap-in or screw-terminal electrolytic capacitors. Owing to the low capacitance of the high-voltage capacitors, these are also subjected to high AC voltages given high alternating currents and typical frequency components of 50 to 300 Hz, it being possible for said high AC voltages to lead to problems in respect of asymmetry which can be overcome by the embodiments described.

The invention claimed is:

1. A capacitor comprising:
    a winding having a cathode foil, an anode foil, separators arranged therebetween and a projection region in which the cathode foil projects beyond the anode foil,
    wherein, in the projection region, a plurality of layers of the cathode foil are arranged to form a bundle and are directly electrically connected to one another; and
    one or more cathode contacts electrically connected to the cathode foil inside the winding at a location which is not in the projection region,
    wherein the projection region has an incision in the cathode foil, and
    wherein the incision runs through a plurality of adjacent layers of the cathode foil.

2. The capacitor according to claim 1, wherein, on account of the incision, flexible strips are present in the cathode foil, and wherein the flexible strips are separated from a rest of the cathode foil in a direction of a winding axis but are connected at their lateral ends to the rest of the cathode foil.

3. The capacitor according to claim 1, wherein each layer of the cathode foil is arranged in the bundle.

4. The capacitor according to claim 1, wherein only a portion of the layers of the cathode foil is arranged in the bundle.

5. The capacitor according to claim 1, wherein a plurality of bundles are formed in the projection region.

6. The capacitor according to claim 1, wherein a plurality of anode connections protrude out of a cover of a housing.

7. The capacitor according to claim 1, wherein the cathode contacts are arranged on the cathode foil in the winding, wherein all of the cathode contacts are at least twice as far away from one lateral edge of the cathode foil as from another lateral edge of the cathode foil in an unrolled state of the cathode foil.

8. The capacitor according to claim 1, wherein a plurality of cathode connections protrude out of a cover of a housing.

9. The capacitor according to claim 1, further comprising an overlap-free region of the cathode foil, in which the cathode foil does not overlap with the anode foil, wherein the overlap-free region adjoins an overlapping region in a lateral direction, in which the cathode foil overlaps with the anode foil, and wherein a cathode contact for making contact with the cathode foil is arranged in the overlap-free region.

10. The capacitor according to claim 9, wherein the overlap-free region is arranged on a lateral edge of the cathode foil.

11. The capacitor according to claim 9, wherein the overlap-free region is arranged between two overlapping regions in the lateral direction.

12. A method for producing a capacitor, the method comprising:
    providing a winding having a cathode foil, an anode foil and separators arranged therebetween, wherein the winding has a projection region in which the cathode foil protrudes beyond the anode foil, and wherein one or more cathode contacts are electrically connected to the cathode foil inside the winding;
    cutting into the cathode foil in the projecting region; and
    bundling a plurality of layers of the cathode foil in the projection region to form a bundle and establishing electrical contact between the layers, wherein the cathode contacts are not connected to the bundle in the projection region.

13. The capacitor according to claim 1, wherein the one or more cathode contacts lead through the projection region and is electrically connected to a base but is not connected in the projection region to the bundle.

14. A capacitor comprising:
    a winding having a cathode foil, an anode foil, separators arranged therebetween and a projection region in which the cathode foil projects beyond the anode foil,
    wherein, in the projection region, a plurality of layers of the cathode foil are arranged to form a bundle and are directly electrically connected to one another; and
    at least one cathode contact electrically connected to the cathode foil inside the winding at a location which is not in the projection region,
    wherein the at least one cathode contact leads through the projection region and is electrically connected to a base but is not connected in the projection region to the bundle.

15. The capacitor according to claim 14, wherein each layer of the cathode foil is arranged in the bundle.

16. The capacitor according to claim 14, wherein only a portion of the layers of the cathode foil is arranged in the bundle.

17. The capacitor according to claim 14, wherein a plurality of anode connections protrude out of a cover of a housing.

18. The capacitor according to claim 14, further comprising an overlap-free region of the cathode foil, in which the cathode foil does not overlap with the anode foil, wherein the overlap-free region adjoins an overlapping region in a lateral direction, in which the cathode foil overlaps with the anode foil, and wherein a cathode contact for making contact with the cathode foil is arranged in the overlap-free region.

19. The capacitor according to claim 18, wherein the overlap-free region is arranged on a lateral edge of the cathode foil.

20. The capacitor according to claim 18, wherein the overlap-free region is arranged between two overlapping regions in the lateral direction.

* * * * *